US012808673B2

(12) United States Patent
Dahl

(10) Patent No.: US 12,808,673 B2
(45) Date of Patent: Nov. 24, 2026

(54) EGO VEHICLE LOCATION DETERMINATION USING SPARSE HIGH-ACCURACY OBJECT LOCATIONS

(71) Applicant: QUALCOMM INCORPORATED, San Diego, CA (US)

(72) Inventor: Martin Dahl, Vikingstad (SE)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 18/517,514

(22) Filed: Nov. 22, 2023

(65) Prior Publication Data

US 2025/0164252 A1 May 22, 2025

(51) Int. Cl.
*G01C 21/30* (2006.01)

(52) U.S. Cl.
CPC .................................... *G01C 21/30* (2013.01)

(58) Field of Classification Search
CPC .... G01C 21/30; G01C 21/1656; G01C 21/28; G01C 25/005; G01C 21/1652
See application file for complete search history.

(56) References Cited

U.S. PATENT DOCUMENTS

2017/0277716 A1* 9/2017 Giurgiu ................... G06F 16/29
2019/0316929 A1* 10/2019 Shin ..................... G05D 1/0246
2019/0370567 A1* 12/2019 Eckman ................. G06V 20/54
2022/0026232 A1 1/2022 Ghadiok et al.
2022/0277480 A1* 9/2022 Tokuhiro ............... G01C 21/30
2022/0353688 A1* 11/2022 Shuman .............. H04W 12/122

FOREIGN PATENT DOCUMENTS

WO WO-2019093316 A1 * 5/2019 ............ G01C 21/28

OTHER PUBLICATIONS

Machine Translation of WO-2019093316-A1 (Year: 2019).*
International Search Report and Written Opinion—PCT/IB2024/000583—ISA/EPO—Jan. 27, 2025.
Yu B., et al., "A Dead Reckoning Calibration Scheme Based on Optimization with an Adaptive Quantum-Inspired Evolutionary Algorithm for Vehicle Self-Localization", Entropy, vol. 24, No. 8, pp. 1-21, Aug. 15, 2022, p. 1128, XP093236243, CH, abstract, pp. 3, 12-17.

* cited by examiner

*Primary Examiner* — Sahar Motazedi
(74) *Attorney, Agent, or Firm* — Holland & Hart LLP

(57) ABSTRACT

A method of determining location of a vehicle includes: obtaining first map data including first identifiers of first objects and corresponding first locations and first uncertainties each of at least a first threshold distance; obtaining second map data including second identifiers of second objects and corresponding second locations and second uncertainties each of less than a second threshold distance, where the first threshold distance is at least twice the second threshold distance, and the first locations have a higher density than the second locations; and determining a location estimate, of the vehicle, based on at least a particular one of the second locations, corresponding to a particular one of the second objects, and at least one of an angle from the vehicle to the particular one of the second objects or a distance between the vehicle and the particular one of the second objects.

20 Claims, 11 Drawing Sheets

1100

| Object ID | Object characteristic(s) | Location | Location uncertainty | Relative location (e.g., distance, direction) | Relative loc unc. | Relative-to ID |
|---|---|---|---|---|---|---|
| 1011 | H - 6m, W - 4m, tree | lat1, long1 | 20m | | | |
| 1012 | stop sign | lat2, long2 | 10m | 6m | 1m | 1011 |
| 1013 | L - 4m, W - 2m, H - 2m, car | lat3, long3 | 8m | | | |
| 1021 | L1, W1, H1 | lat4, long4 | 2cm | | | |
| 1022 | Traffic light model 1 | lat5, long5 | 0.5m | | | |

Column labels: 1110, 1120, 1130, 1140, 1150, 1160, 1170. Row labels: 1101, 1102, 1103, 1104, 1105.

EGO VEHICLE LOCATION DETERMINATION USING SPARSE HIGH-ACCURACY OBJECT LOCATIONS

BACKGROUND

An autonomous-driving vehicle (called an ego vehicle) may use information about a current location of the ego vehicle as the ego vehicle moves along streets or other terrain. To obtain location information, the ego vehicle may receive and use Satellite Positioning System (SPS) signals (e.g., Global Positioning System (GPS) signals, Global Navigation Satellite System (GNSS) signals, etc.) to determine a current position of the ego vehicle, and in turn use that current position information as input for navigation applications. In an SPS, the position of a receiver of SPS signals may be determined by precisely measuring the arrival times of signals received from multiple satellites, determining ranges between the satellites and the receiver, and using the ranges to determine the location of the receiver by trilateration. SPS signals are not, however, always reliably received by a receiver, e.g., of an ego vehicle. For example, SPS accuracy may degrade significantly under weak signal conditions such as when the line-of-sight (LOS) between the receiver and the satellite(s) is obstructed, e.g., by natural and/or artificial (human-made) objects, such as tall buildings, mountains, or canyon walls. Depending on the environment, the ego vehicle may not receive an SPS signal, or the accuracy of the SPS may be poor, resulting in positional errors on the order of tens of meters (e.g., 50 meters).

Another navigational system that may be employed by a vehicle is known as dead reckoning. With dead reckoning, an initial position of a vehicle may be determined (e.g., using SPS signals), and distance(s) traveled and corresponding heading(s) of the vehicle may be determined using various sensors of the vehicle. The distance(s) at the corresponding heading(s) may be added to the initial position to calculate an updated position of the vehicle. The accuracy of dead reckoning positions depend on the accuracy of the sensors used to determine distance(s) and heading(s) traveled. Error induced by lack of accuracy of one or more sensors may, especially over long stretches of time, result in significant error in the determined distance(s) travelled and/or bias(es) in the heading(s) of the vehicle, resulting in inaccurate updated vehicle positions.

SUMMARY

An example method of determining location of a vehicle includes: obtaining first map data including first identifiers of first objects and first locations corresponding to the first objects, the first locations having first uncertainties each of at least a first threshold distance, and the first locations having a first density of the first locations per unit of area; obtaining second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determining a location estimate, of the vehicle, based on at least a particular one of the second locations, corresponding to a particular one of the second objects, and at least one of an angle from the vehicle to the particular one of the second objects or a distance between the vehicle and the particular one of the second objects.

An example apparatus, of an ego vehicle, includes: at least one memory; at least one receiver; and at least one processor, communicatively coupled to the at least one memory and the at least one receiver, configured to: obtain first map data including first identifiers of first objects and first locations corresponding to the first objects, the first locations having first uncertainties each of at least a first threshold distance, and the first locations having a first density of the first locations per unit of area; obtain second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determine a location estimate, of the ego vehicle, based on at least a particular one of the second locations, corresponding to a particular one of the second objects, and at least one of an angle from the apparatus to the particular one of the second objects or a distance between the apparatus and the particular one of the second objects.

Another example apparatus, of an ego vehicle, includes: means for obtaining first map data including first identifiers of first objects and first locations corresponding to the first objects, the first locations having first uncertainties each of at least a first threshold distance, and the first locations having a first density of the first locations per unit of area; means for obtaining second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and means for determining a location estimate, of the ego vehicle, based on at least a particular one of the second locations, corresponding to a particular one of the second objects, and at least one of an angle from the ego vehicle to the particular one of the second objects or a distance between the ego vehicle and the particular one of the second objects.

An example non-transitory, processor-readable storage medium includes processor-readable instructions to cause at least one processor of an apparatus, of an ego vehicle, to: obtain first map data including first identifiers of first objects and first locations corresponding to the first objects, the first locations having first uncertainties each of at least a first threshold distance, and the first locations having a first density of the first locations per unit of area; obtain second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determine a location estimate, of the ego vehicle, based on at least a particular one of the second locations, corresponding to a particular one of the second objects, and at least one of an angle from the ego vehicle to the particular one of the second objects or a distance between the ego vehicle and the particular one of the second objects. An apparatus, of an ego vehicle, includes: at least one memory; at least one receiver; and at least one processor, communicatively coupled to the at least one memory and the at least one receiver, configured to: obtain first map data including first identifiers of first objects and first locations corresponding to the first objects, the first locations having first uncertainties each of at least a first threshold distance, and the first locations having a first density of the first locations per unit of area; obtain second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determine a location estimate, of the ego vehicle, based on at least a particular one of the second locations, corresponding to a particular one of the second objects, and at least one of an angle from the apparatus to the particular one of the second objects or a distance between the apparatus and the particular one of the second objects.

DETAILED DESCRIPTION

Techniques and apparatus configurations are discussed herein for enhancing standard-definition maps for use in locating a device, e.g., for egomotion (e.g., determining locations over time of an ego vehicle). For example, objects with locations known to a fine resolution (e.g., within 2 cm) may be sparsely distributed throughout an otherwise standard-definition map (e.g., with objects of locations known to a coarse resolution (e.g., within 25 m such as within a region of a two-dimensional map grid of regions with each region comprising a 25 m×25 m square). An ego vehicle reference location may be determined based on one or more ranges to known locations of objects within sight of the ego vehicle. These techniques and apparatus configurations are examples, and other techniques and/or apparatus configurations may be used.

Items and/or techniques described herein may provide one or more of the following capabilities, as well as other capabilities not mentioned. By using at least one fine-resolution-location object to determine the ego vehicle location, the location of the ego vehicle may be determined more accurately than by using standard-definition map objects alone. Enough fine-resolution-location objects may be used to determine the ego vehicle location such that an error in the determined location of the ego vehicle may be dominated by sensor detection error rather than object location uncertainty (which may be called object location error). Dead reckoning may be used to determine one or more locations of the ego vehicle relative to an ego vehicle reference location. Error in the dead reckoning location may be corrected by using location measurements of objects of known location that are identifiable in the area surrounding the ego vehicle. Using objects with known fine-resolution locations may essentially remove object location error (e.g., relative to the object location error of the standard definition map alone). Other capabilities may be provided and not every implementation according to the disclosure must provide any, let alone all, of the capabilities discussed.

Figure 1:
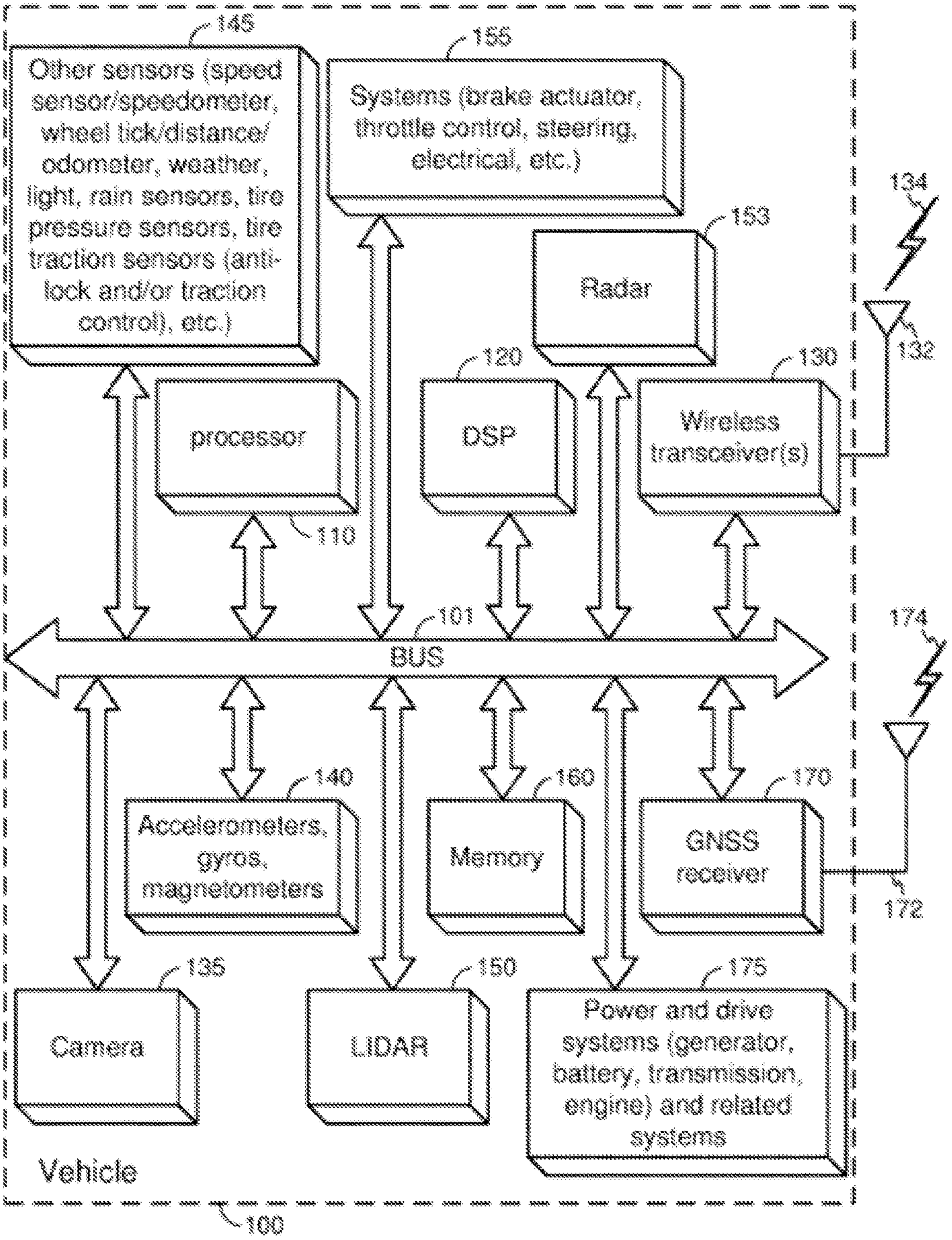
FIG. 1 is a block diagram of components of an example vehicle.

Referring to FIG. 1, a vehicle 100 may include example sensor and communications components and/or systems as shown. The vehicle 100 may include a processor 110, a DSP 120 (digital signal processor), a wireless transceiver 130, a camera 135, a motion/orientation sensor 140, one or more other sensors 145 (e.g., driving and/or environmental sensors), a lidar 150, a radar 153, one or more systems 155, a memory 160, an SPS receiver 170 (in this example a GNSS receiver), and one or more power and drive systems 175. Even if a component of the vehicle 100 is referred to in the singular, the vehicle 100 may include one or more of such components (e.g., one or more processors, one or more memories, one or more cameras, one or more sensors, etc.). The vehicle 100 may be a car, but other forms of vehicles may be used.

The camera 135 may be configured to capture still photos and/or video to provide information regarding motion of the vehicle 100 and/or presence of one or more objects within sight of the vehicle 100. The camera 135 may comprise a camera sensor and mounting assembly. Different mounting assemblies may be used for different cameras on the vehicle 100. For example, front facing cameras may be mounted in a front bumper of the vehicle 100, in a stem of a rear-view mirror assembly of the vehicle 100, or in other front-facing areas of the vehicle 100. The camera 135 may comprise one or more rear-facing cameras mounted in a rear bumper/fender, on a rear windshield, and/or on a trunk or other rear-facing area of the vehicle 100. Side-facing mirrors may be mounted on one or more sides of the vehicle 100 such as being integrated into one or more mirror assembling and/or one or more door assemblies. The camera 135 may provide object detection and distance estimation, particularly for objects of known size and/or shape (e.g., stop signs and license plates have respective standardized sizes and shapes) and may provide information regarding rotational motion relative to an axis of the vehicle 100 such as during a turn. The camera 135 may be calibrated through the use of one or more other systems such as through the use of the lidar 150, a wheel tick/distance sensor, and/or a GNSS receiver to verify distance traveled and possibly angular orientation.

The camera 135 may be used to verify and calibrate one or more other systems, e.g., to verify that distance measurements are correct. For example, the camera 135 may be used to determine that the vehicle 100 has moved between objects (e.g., landmarks, roadside markers, road mile markers, etc.) that have known separations and comparing these distances with distances determined by the other sensor(s). As another example, the camera 135 may be used to verify that object detection is performed accurately such that objects are mapped to the correct locations relative to the vehicle 100 by the lidar 150 and/or one or more other sensors. Information from the camera 135 may be combined with, for example, information from one or more accelerometers to determine an impact time with a road hazard (e.g., an estimated time before hitting a pot hole) which may be verified against actual time of impact and/or verified against stopping models and/or maneuvering models. Verification against a stopping model may compare the impact time determined from camera data against an estimated stopping distance if attempting to stop before hitting an object. Verification against a maneuvering model may verifying whether current estimates for turning radius at current speed and/or a measure of maneuverability at current speed are accurate in the current conditions and modifying accordingly to update estimated parameters based on camera and/or other sensor measurements.

The motion/orientation sensor 140 may include one or more accelerometers, one or more gyroscopes, and/or one or more magnetometers 140 and may be utilized to provide and/or verify motion and directional information. Accelerometers and gyros may be utilized to monitor wheel and drive train performance. Accelerometers, may also be utilized to verify actual time of impact with road hazards such as potholes relative to predicted times based on existing stopping and acceleration models as well as steering models. Gyros and magnetometers may be utilized to measure rotational status of the vehicle 100 and/or orientation relative to magnetic north. Gyros and magnetometers may be utilized to measure and calibrate estimates and/or models for turning radius at current speed and/or a measure of maneuverability at current speed, particularly when used in concert with measurements from one or more other external and/or internal sensors such as the other sensors 145 (e.g., speed sensors, wheel tick sensors, and/or odometer measurements).

The lidar 150 may use pulsed laser light to measure ranges to objects. While cameras may be used for object detection, the lidar 150 may be able to detect relative distances, relative orientations, and/or relative motion of the objects (relative to the vehicle 100) with more certainty, especially in regard to objects of unknown size and shape. Measurements from the lidar 150 may be used to estimate relative rate of travel, relative motion directions, relative position, and/or stopping distance (to avoid a collision between the vehicle 100 and an object) by providing accurate distance measurements and delta distance measurements.

The memory 160 may be utilized with the processor 110 and/or the DSP 120. The memory 160 may be a non-transitory storage medium that may include random access memory (RAM), flash memory, disc memory, and/or read-only memory (ROM), etc. The memory 160 may contain instructions to implement various methods described throughout this description including, for example, processes to implement the use of relative positioning between vehicles and between vehicles and external reference objects such as roadside units. The memory 160 may contain instructions for operating and calibrating sensors, and for receiving map, weather, vehicular data (of the vehicle 100 and/or of surrounding vehicles), and/or other data, and for utilizing various internal and/or external sensor measurements and/or received data and/or received measurements to determine driving parameters such as relative position, absolute position, stopping distance, acceleration, and/or turning radius at current speed and/or maneuverability at current speed, inter-car distance, turn initiation/timing and performance, and/or initiation/timing of driving operations. The memory 160 may store software which may be processor-readable, processor-executable software code containing instructions that may be configured to, when executed, cause one or more processors (e.g., the processor 110 and/or the DSP 120) to perform various functions described herein. Alternatively, the software may not be directly executable by the processor but may be configured to cause the processor, e.g., when compiled and executed, to perform the functions. The description herein may refer to the processor 110 performing a function, but this includes other implementations such as where the processor 110 executes software and/or firmware. The description herein may refer to the processor 110 performing a function as shorthand for one or more of the processors 110, 120 performing the function. The description herein may refer to the vehicle 100 performing a function as shorthand for one or more appropriate components of the vehicle 100 performing the function. The processor 110 may include a memory with stored instructions in addition to and/or instead of the memory 160. Functionality of the processor 110 is discussed more fully below.

Power and drive systems (generator, battery, transmission, engine) and related systems 175 and systems (brake, actuator, throttle control, steering, and electrical) 155 may be controlled by the processor(s) and/or hardware or software or by an operator of the vehicle or by some combination thereof. The systems (brake, actuator, throttle control, steering, electrical, etc.) 155 and power and drive or other systems 175 may be utilized in conjunction with performance parameters and operational parameters, to enable autonomously (and manually, relative to alerts and emergency overrides/braking/stopping) driving and operating a vehicle 100 safely and accurately, such as to safely, effectively and efficiently merge into traffic, stop, accelerate and otherwise operate the vehicle 100. Input from the various sensor systems such as camera 135, accelerometers, gyros and magnetometers 140, LIDAR 150, GNSS receiver 170, RADAR 153, input, messaging and/or measurements from wireless transceiver(s) 130 and/or other sensors 145 or various combinations thereof, may be utilized by processor 110 and/or DSP 120 or other processing systems to control power and drive systems 175 and systems (brake actuator, throttle control, steering, electrical, etc.) 155.

A global navigation satellite system (GNSS) receiver may be utilized to determine position relative to the earth (absolute position) and, when used with other information such as measurements from other objects and/or mapping data, to determine position relative to other objects such as relative to other cars and/or relative to the road surface.

GNSS receiver 170 may support one or more GNSS constellations as well as other satellite-based navigation systems. For example, GNSS receiver 170 may support global navigation satellite systems such as the Global Positioning System (GPS), the Global'naya Navigatsionnaya Sputnikovaya Sistema (GLONASS), Galileo, and/or BeiDou, or any combination thereof. In an embodiment, GNSS receiver 170 may support regional navigation satellite systems such as NAVIC or QZSS or combination thereof as well as various augmentation systems (e.g., satellite based augmentation systems (SBAS) or ground based augmentation systems (GBAS)) such as Doppler orbitography and radio-positioning integrated by satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver(s) 130 and antenna(s) 132 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 170 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from roadside devices, also known as roadside units or RSU, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

Radio detection and ranging-radar 153, uses transmitted radio waves that are reflected off of objects. The reflected radio waves are analyzed, based on the time taken for reflections to arrive and other signal characteristics of the reflected waves to determine the location of nearby objects. Radar 153 may be utilized to detect the location of nearby cars, roadside objects (signs, other vehicles, pedestrians, etc.) and will generally enable detection of objects even if there is obscuring weather such as snow, rail or hail. Thus, radar 153 may be used to complement LIDAR 150 systems and camera 135 systems in providing ranging information to other objects by providing ranging and distance measurements and information when visual-based systems typically fail. Furthermore, radar 153 may be utilized to calibrate and/or sanity check other systems such as LIDAR 150 and camera 135. Ranging measurements from radar 153 may be utilized to determine/measure stopping distance at current speed, acceleration, maneuverability at current speed and/or turning radius at current speed and/or a measure of maneuverability at current speed. In some systems, ground penetrating radar may also be used to track road surfaces via, for example, RADAR-reflective markers on the road surface or terrain features such as ditches.

The vehicle 100 may further contain multiple wireless transceivers including WAN, WLAN and/or PAN transceivers. In an embodiment, radio technologies that may support wireless communication link or links further comprise Wireless local area network (e.g., WLAN, e.g., IEEE 802.11), Bluetooth (BT) and/or ZigBee.

Figure 2:
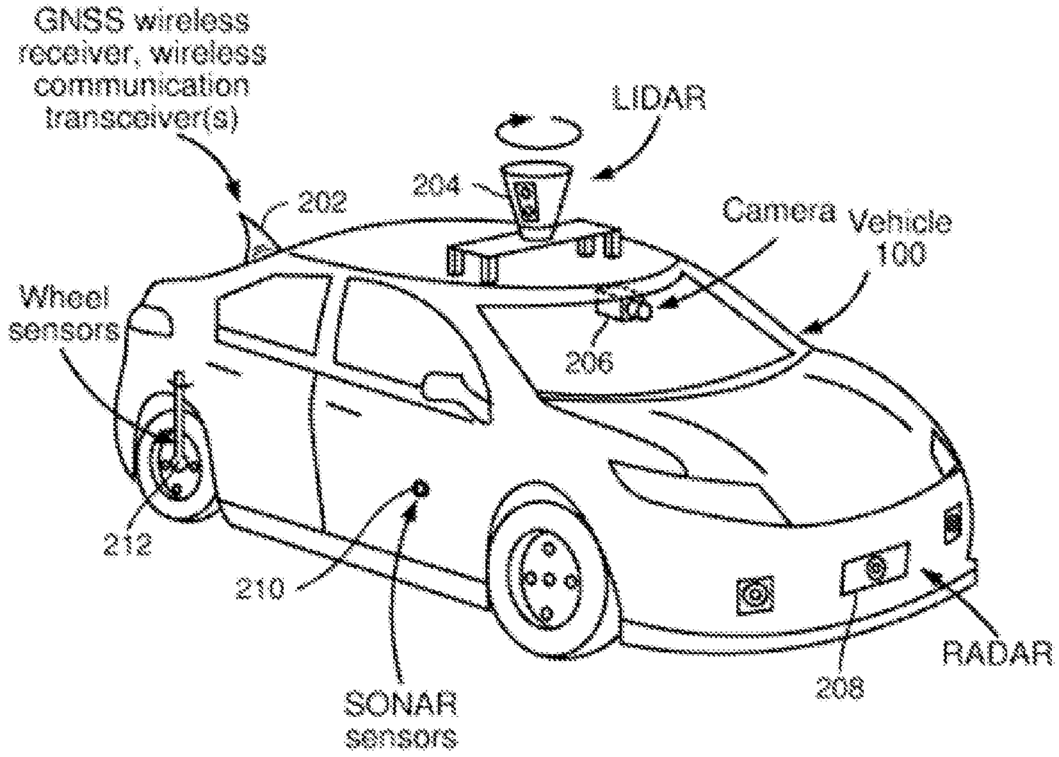
FIG. 2 is a perspective view of the vehicle shown in FIG. 1.

Referring also to FIG. 2, a vehicle 200 (which may be an example of the vehicle 100) may be configured with one or more sensors, communication components, and/or other systems. For example, the vehicle 200 may have one or more cameras such as a rear view mirror-mounted camera 206, front fender-mounted camera (not shown), side mirror-mounted camera (not shown) and a rear camera (not shown, but typically on the trunk, hatch or rear bumper). Vehicle 100 may also have a LIDAR system 204, for detecting objects and measuring distances to those objects; LIDAR system 204 is often roof-mounted, however, if there are multiple LIDAR systems 204, they may be oriented around the front, rear and sides of the vehicle. Vehicle 100 may have other various location-related systems such as a GNSS receiver 170 (typically located in the shark fin unit on the rear of the roof), various wireless transceivers (such as WAN, WLAN, V2X; typically but not necessarily located in the shark fin) 202, RADAR system 208 (typically in the front bumper), and SONAR 210 (typically located on both sides of the vehicle, if present). Various wheel sensors 212 and drive train sensors may also be present, such as tire pressure sensors, accelerometers, gyros, and wheel rotation detection and/or counters. It is realized that this list is not intended to be limiting and that FIG. 2 is intended to provide example locations of various sensors in an embodiment of vehicle 100. In addition, further detail in regard to particular sensors is described relative to FIG. 1.

Figure 3:
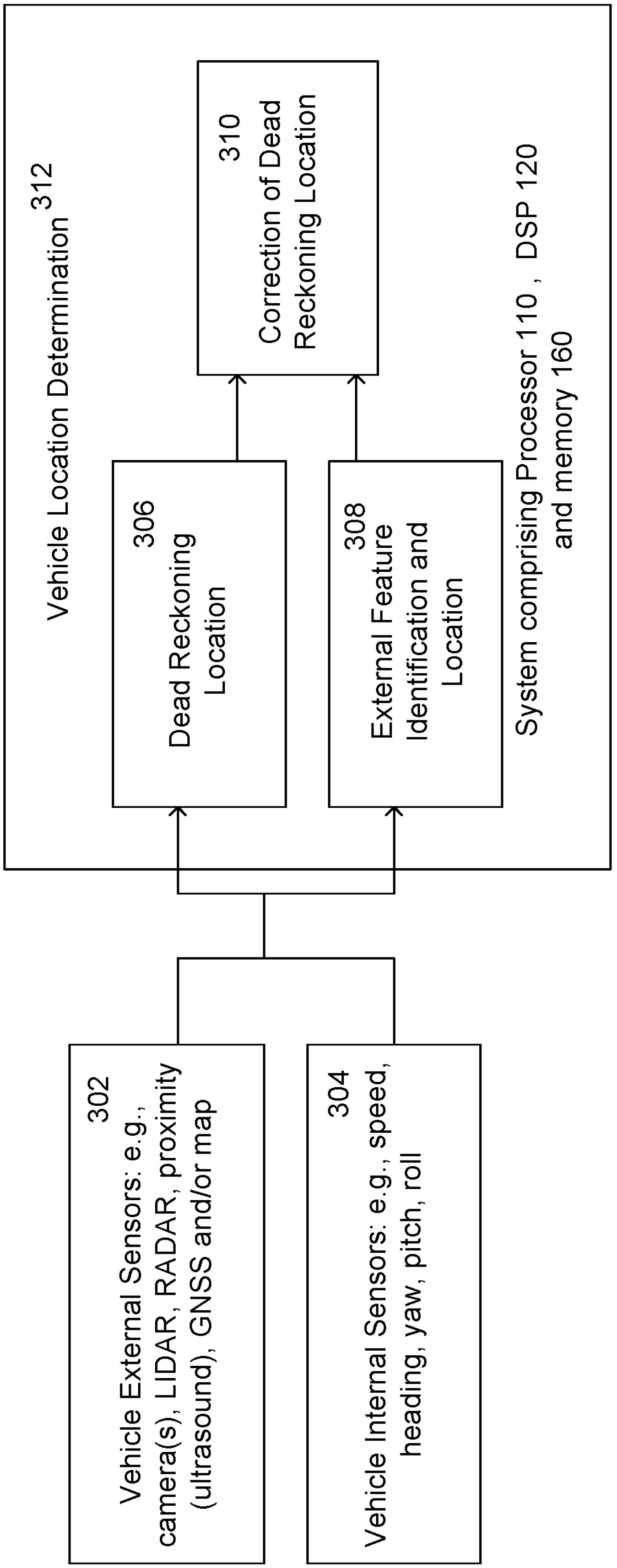
FIG. 3 is a functional block level diagram of the vehicle shown in FIG. 1.

Referring to FIG. 3, a functional block level diagram of an example vehicle that determines its location by dead reckoning, and corrects for error in the dead reckoning location based on external feature measurements is shown. Vehicle 100 may receive vehicle information from vehicle external sensors 302 and vehicle internal sensors 304. The received vehicle sensor information may then be processed in Vehicle Location Determination module 312. The Vehicle Location Determination module 312, which may include one or more processors executing code, may further include modules, such as an External Feature Identification and Location Measurements Module 308, as well as a Current Dead Reckoning Location Module 306. Based on the location measurements of the identified external features, the dead reckoning location of the vehicle may be corrected by a Correction of Dead Reckoning Location Module 310.

Vehicle external sensors 302 may include, without limitation, cameras 206, LIDAR system 204, radar system 208, proximity sensors, rain sensors, weather sensors, GNSS receivers 170 and received data used with the sensors such as map data, environmental data, location, route and/or other vehicle or external feature information (see also FIGS. 1 and 2, and accompanying text). Vehicle internal sensors 304 may include: wheel sensors 212 such as tire pressure sensors, brake pad sensors, brake status sensors, speedometers and other speed sensors; heading sensors and/or orientation sensors such as magnetometers and geomagnetic compasses; distance sensors such as odometers and wheel tic sensors; inertial sensors such as accelerometers and gyros as well as inertial positioning results using the above-mentioned sensors; and yaw, pitch and/or roll sensors as may be determined individually or as determined using other sensor systems such as accelerometers, gyros and/or tilt sensors.

Both vehicle internal sensors 304 and vehicle external sensors 302 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values. The car status values derived from measurements from internal and external sensors may be further combined with car status values and/or measurements from other sensor systems using a general or applications processor. In an embodiment, the sensors may be segregated into related systems, for example, LIDAR, radar, motion, wheel systems, etc., operated by dedicated core processing for raw results to output car status values from each core that are combined and interpreted to derive combined car status values, including capability data elements and status data elements, that may be used to control or otherwise affect car operation.

Figure 4:
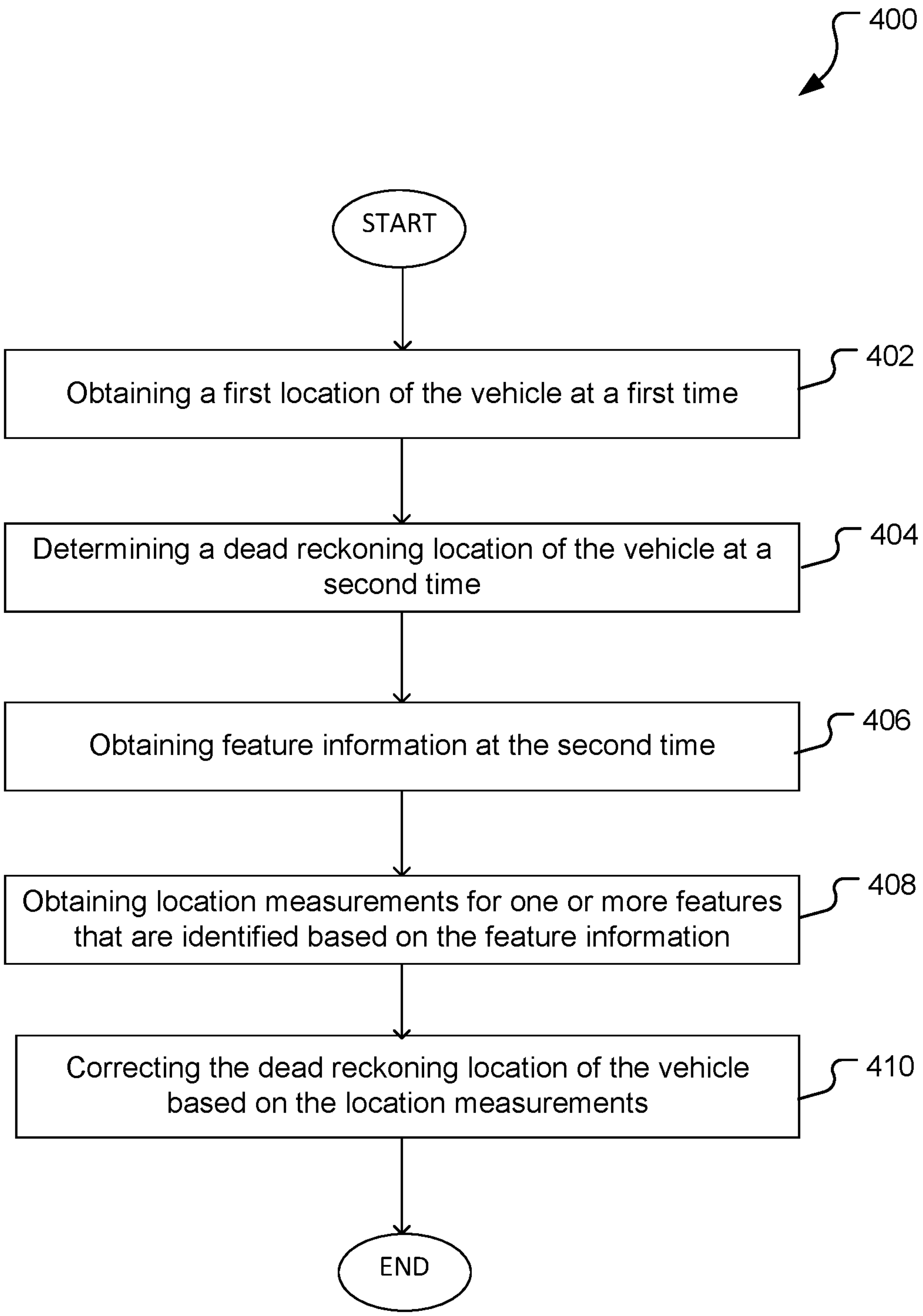
FIG. 4 is a block flow diagram of an example method for providing correction of a dead reckoning location of a vehicle.

Referring to FIG. 4, with further reference to FIGS. 1-3, an example method 400 for determining a dead reckoning location of a vehicle, and correcting associated errors is shown. The method 400 is, however, an example and not limiting. The method 400 may be altered, e.g., by having single stages split into multiple stages.

At stage 402, the method includes obtaining a first location of the vehicle at a first time. The GNSS receiver 170 and the processor 110 are a means for obtaining the first location. In an example, the processor 110 and the accelerometers, gyros, and magnetometers 140 may be a means for obtaining the first location. For example, the first location may be, without limitation, provided by utilizing GPS/GNSS, or may be a previously determined dead reckoning location.

At stage 404, the method includes determining a dead reckoning location of the vehicle at a second time. The Dead Reckoning Location Module 306 is a means for determining the dead reckoning location. In an example, the Dead Reckoning Location Module 306 may be configured to receive various measurements from the Vehicle Internal Sensors 304 and Vehicle External Sensors 302 to determine a dead reckoning location at a second time. Dead Reckoning or DR as it is usually referred, is the process by which a current position is calculated based on a previously obtained position. Generally, the dead reckoning location of the vehicle at the second time may be determined by advancing the first location based on sensor information providing, without limitation, heading, speed, and time, as known in the art. For example, the vehicle 100 may be equipped with sensors 145 and corresponding vehicle dimensions, such as wheel circumference measurements, and may be configured to record wheel rotations and steering direction. Other sensors such as one or more inertial sensors (e.g., accelerometer, gyroscope, solid state compass) may also be used.

Error may accumulate based on sensor instability or other non-linearities associated with the sensor input. In an example, referring to FIG. 5, error that may result when performing dead reckoning (DR) are shown. A first location 502 determined at stage 402 may, without limitation, be obtained via the GNSS receiver 170, which may include some amount of error (e.g., an uncertainty value). As a result, a subsequent dead reckoning (DR) estimate may also include the initial error, as well as other accumulated sensor error. For example, the sensor information provided to the Dead Reckoning Location Module 306 may be slightly inaccurate, and may result in a right or left bias, as shown in path 504, and/or an erroneous distance. The corresponding DR location of the vehicle determined at stage 404 may include such errors.

Referring back to FIG. 4, the error in the dead reckoning position estimate may be corrected. To accomplish this, initially, at stage 406, the method includes obtaining feature information at the second time. The processor 110 and the wireless transceiver(s) 130 are a means for obtaining feature information at a second time. In an example, obtaining the feature information may include retrieving from memory 160 or other sources those features in the surrounding area that may be identifiable via the various vehicle sensors. These features may include, without limitation, an intersection, a crosswalk, a geographic landmark, a building, a width of a road, a road sign, the width of the road, a traffic light, a telephone post, highway exits, and/or a lamp post. The feature information may include records for at least some of the vehicle's surrounding objects, which may be included, for example, in a digital map or database. These records may include relative positional attributes in addition to traditional absolute positions. The records may also include identification data sufficient to identify the feature in the sensor data received. A GNSS receiver 170 and/or wireless transceiver 130 may be utilized to obtain the feature information. The vehicle 100 may be configured to provide location coordinates (e.g., lat./long.) to a third party service provider to obtain information regarding those features located in an area proximate to a coarse position of the vehicle. The coarse position of the vehicle 100 may be based on the dead reckoning location determined at the second time, and/or on other positioning techniques such as, for example, GPS. The extent of the surrounding area of the vehicle 100 to be searched (for features) may be based on a configuration option or other application criteria (e.g., a position uncertainty value) and may encompass a range of, without limitation, 100, 200, 500, 1000 yards around the course location of the vehicle 100. In an example, the vehicle 100 may have feature/coarse map information stored in local memory 160, and the vehicle 100 may parse the feature/coarse map information to determine those features proximate to the vehicle 100.

At stage 408, the method includes obtaining location measurements for one or more features that are identified based on the feature information. The External Feature Identification and Location Measurements Module 308 is a means for obtaining the location measurements. Stage 408 may include obtaining sensor information from the one or more sensors 302 and 304 (described above). The sensor information obtained is provided to the External Feature Identification and Location Measurements Module 308, whereupon various recognition techniques known in the art may be utilized to identify one or more features in the surrounding area. For example, a vision/optical sensor(s) (e.g., a camera 135) may be configured to obtain images proximate to the vehicle 100. A recognition process(es) may be performed on the obtained images using, in part, the feature information obtained in stage 406, whereby one or more feature(s) is identified. Once a feature(s) is identified, a radar or LIDAR system (or other sensor) may obtain a range and/or a bearing to the identified feature relative to the vehicle 100. Other sensors may be configured to provide other information. The sensor information may be obtained on demand or periodically, such as based on a sensor duty cycle. The one or more location measurements may include, without limitation, temporal separation measurements, in addition to spatial separation measurements. Range sensors, such as included in the vehicle external sensors 302, may be used in conjunction with inertial measurement devices (e.g., gyroscopes, accelerometers 140) to determine a bearing and elevation to an object based on the coordinate system and the orientation of the range sensor.

Figure 5:
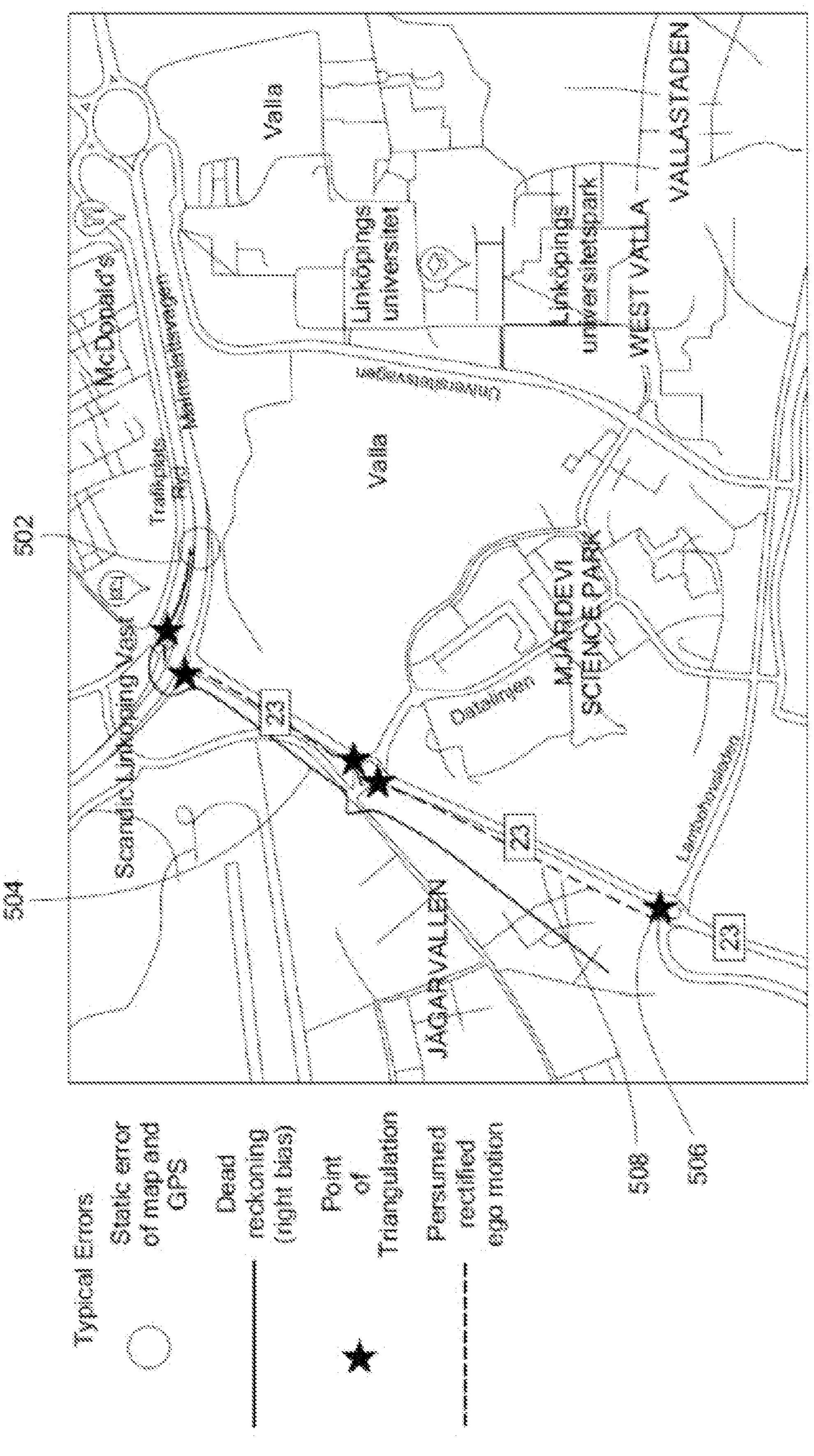
FIG. 5 is a diagram of example errors that may result when performing dead reckoning (DR), and corrections thereof.

At stage 410, the method includes correcting the dead reckoning location of the vehicle based on the location measurements, as illustratively shown in path 508, depicted in FIG. 5. The Correction of Dead Reckoning Location Module 310 is a means for correcting the dead reckoning location. The known locations of the identifiable feature(s), along with the sensed range and/or bearing to the identifiable features may be used to improve the accuracy of the dead reckoning location. For example, depending on the number of features identified and their known absolute locations, and using spatial separation (e.g., range and/or bearing) and/or temporal separation, a corrected location of the vehicle 100 may be determined, using location techniques known in the art. Illustratively, triangulation, as shown in FIG. 6, and/or trilateration may be used to determine the corrected location of the vehicle.

Figure 6:
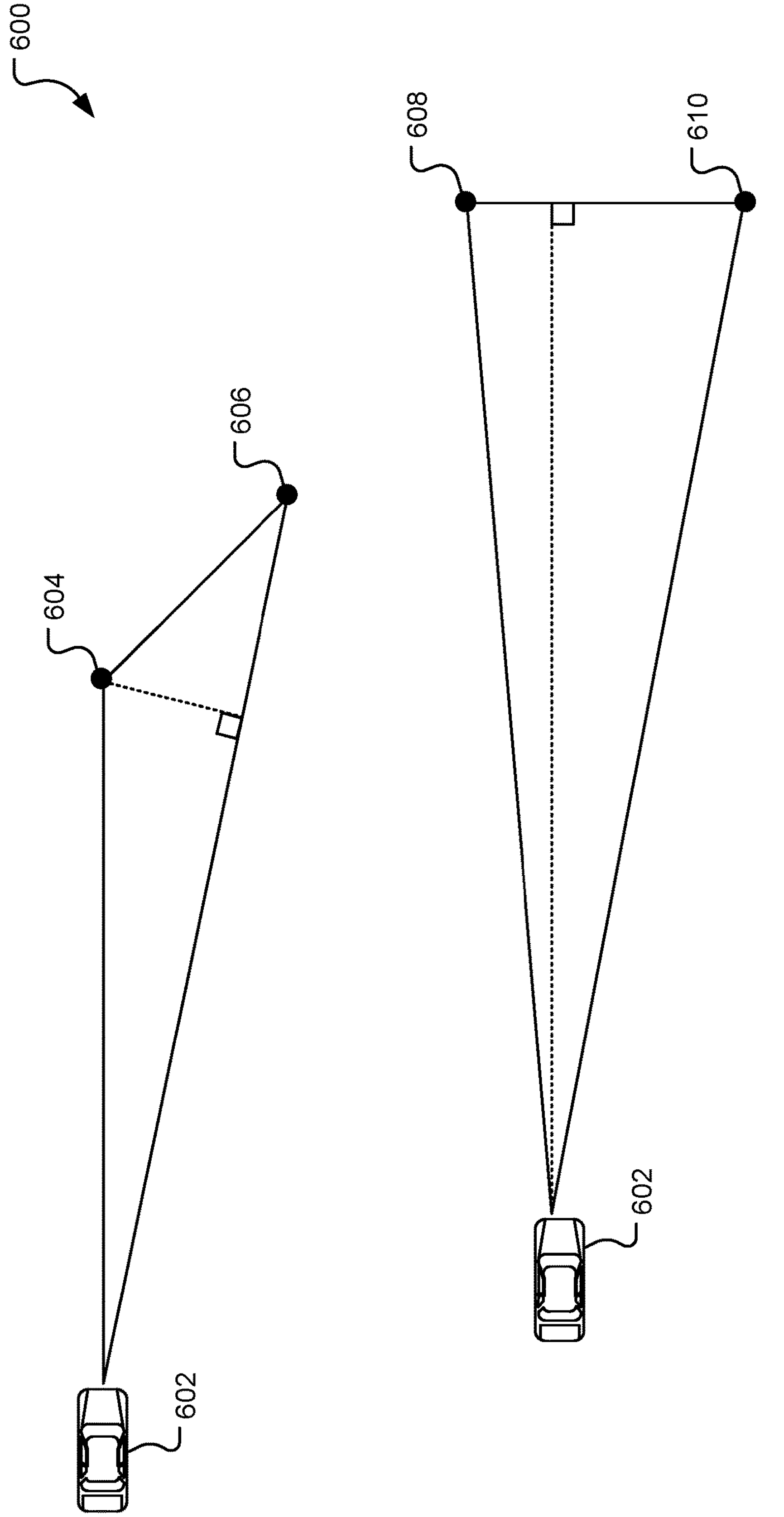
FIG. 6 is a diagram of example triangulation based on feature location measurements to determine location of a vehicle.

Referring to FIG. 6, diagram 600 of example triangulation based on feature location measurements to determine a location of a vehicle is shown. The diagram 600 includes a vehicle 602 and a plurality of roadside features including a first feature 604, a second feature 606, a third feature 608, and a fourth feature 610. The vehicle 602 may include some or all of the components of the vehicle 100, and the vehicle 100 may be an example of the vehicle 602. Each of the features 604, 606, 608, 610 may be an intersection, a crosswalk, a geographic landmark, a building, a width of a road, a road sign, a traffic light, a telephone post, a highway exit, a lamp post, or another object which may be detected by one or more of the vehicle external sensors 302. Feature information such as respective locations and other distinguishing aspects which may be detected by the external sensors 302 (e.g., text, expected return signal, chromatic configurations, etc.) may be provided at stage 406, and the external feature identification and location measurements module 308 may be configured to utilize the sensor input to determine the locations of the features. The vehicle location determination module 312 may be configured to utilize the spatial separation and relative positions of the features to perform trilateration computations. In a first example, the vehicle 602 may utilize the locations and respective ranges to the first feature 604 and the second feature 606 to determine a first position estimate. In a second example, the vehicle 602 may utilize the locations and respective ranges to the third feature 608 and the fourth feature 610 to determine a second position estimate. Temporal separation between feature detection and range measurement may also be used. For example, longitudinal and lateral corrections may be separated by respective projections on the X-axis and Y-axis. In this way, a single feature may be used to determine a position estimate for a vehicle (e.g., a running fix). Other electronic measurement techniques such as Doppler, angle of departure (of transmitted signals), angle of arrival (of reflected signals), and signal strength information may be used for determining a position of a vehicle.

Referring back to FIG. 5, as the vehicle 100 continues to move, the first location may be set to the corrected dead reckoning location of the vehicle, and the dead reckoning procedure may be repeated. More particularly, a second dead reckoning position may be determined at a third time, along with obtaining second feature information. Second location measurements for one or more features that are identifiable based on the second feature information are obtained, and the dead reckoning location of the vehicle is corrected based on the second location measurements. The triangulation/trilateration techniques described with respect to FIG. 6 may be applied to correct the location estimate of the vehicle 100 at various correction points 506 to determine the location measurements and correct the dead reckoning location of the vehicle at stage 410.

Obtaining location measurements for one or more features may include sensor fusion. By using sensor fusion, inputs from a plurality of sources/sensors, such as, a GPS/map, a LIDAR sensor(s), a radar sensor(s) and/or a camera(s) can be combined using software algorithms, as known in the art, to determine location measurements. The resulting measurement is more accurate because it balances the strengths of the different sensors. Each type of sensor has various strengths and/or weaknesses. Radars accurately determine distance and speed-even in challenging weather conditions but can't read street signs or "see" the color of a stoplight. Cameras can read signs for classifying objects, however, they can easily be blinded by weather conditions, dirt etc. LIDAR may accurately detect objects, but they generally don't have the range or affordability of cameras or radar. A vehicle may also use sensor fusion to fuse information from multiple sensors of the same type as well, to take, for example, advantage of partially overlapping fields of view.

Figure 7:
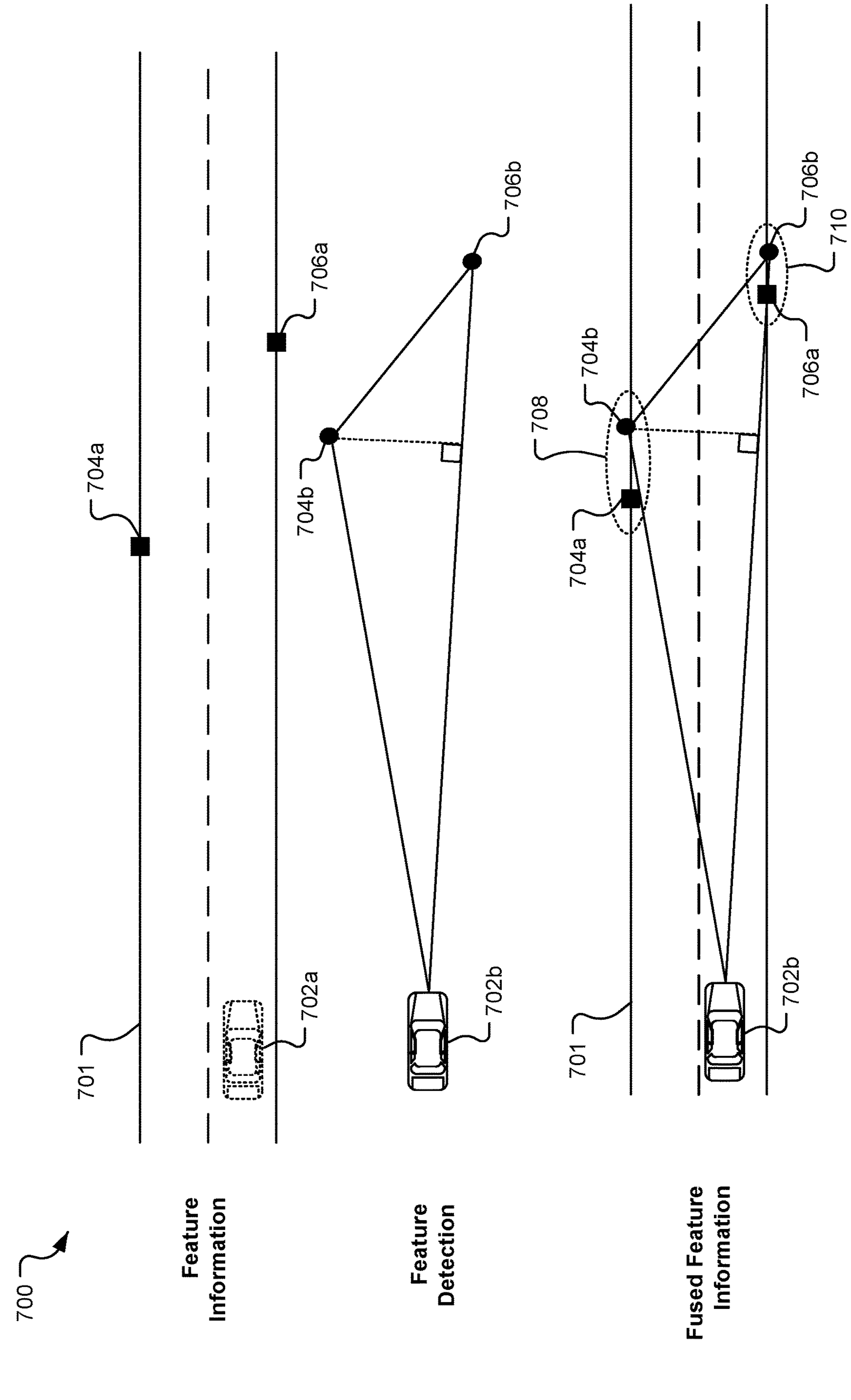
FIG. 7 is an example of map and sensor information fusion.

Referring to FIG. 7, a diagram 700 of example of map and sensor information fusion is shown. The diagram 700 includes a road segment 701 with a plurality of features and corresponding locations based on map information and sensor measurements. In an example, a vehicle may be at an assumed position **702*a* and may receive feature information including a first map location 704*a* of a first feature, and a second map location 706*a* of a second feature. A measured position 702*b* of the vehicle may be based on measurements of the first feature and the second features. In an example, the measured position 702*b* may also be based on external measurements, such as a GNSS or other terrestrial measurements. As a result of the computation of the measured position 702*b* and the respective measurements to the first and second features, the first feature may be determined to be at a first measured location 704*b*, and the second feature may be determined to be at a second measured location 706*b*. The vehicle may be configured to generate fused locations for the features based on the respective map locations 704*a*, 706*a* and the measured locations 704*b*, 706*b*. For example, a first fused location 708 may be based on the average of the first map location 704*a* and the first measured location 704*b*, and a second fused location 710 may be based on the average of the second map location 706*a* and the second measured location 706*b*. In an example, the average location may be determined based on averaging the respective coordinate measurements (e.g., lat/long/alt) for each feature and each respective measurement and map data. While FIG. 7 illustrates one measurement for each of the features, additional measurements for each feature based on different sensors may also be obtained. In an example, correcting the DR location at stage 410** may be based on applying the measurements obtained by the vehicle (e.g., measured range, angle of arrival, etc.) to the respective fused locations of the features.

In an example, the measured location **702*b*** of the vehicle may be based on machine learning methods or algorithms. For example, training data including detection of known features may be associated with known locations. Range measurements and other signal analysis (e.g., reflected signal strengths, the channel response at a location, etc.) may be also be used as training data that is associated with known locations of the vehicle. In an example, correcting the error in the dead reckoning may also be realized by compiling correction data pertaining to the location of the vehicle over time. Other machine learning, artificial intelligence and/or neural network methods and algorithms may be used with the compiled correction data to predict errors in dead reckoning position estimates and determine a current location of the vehicle.

Figure 8:
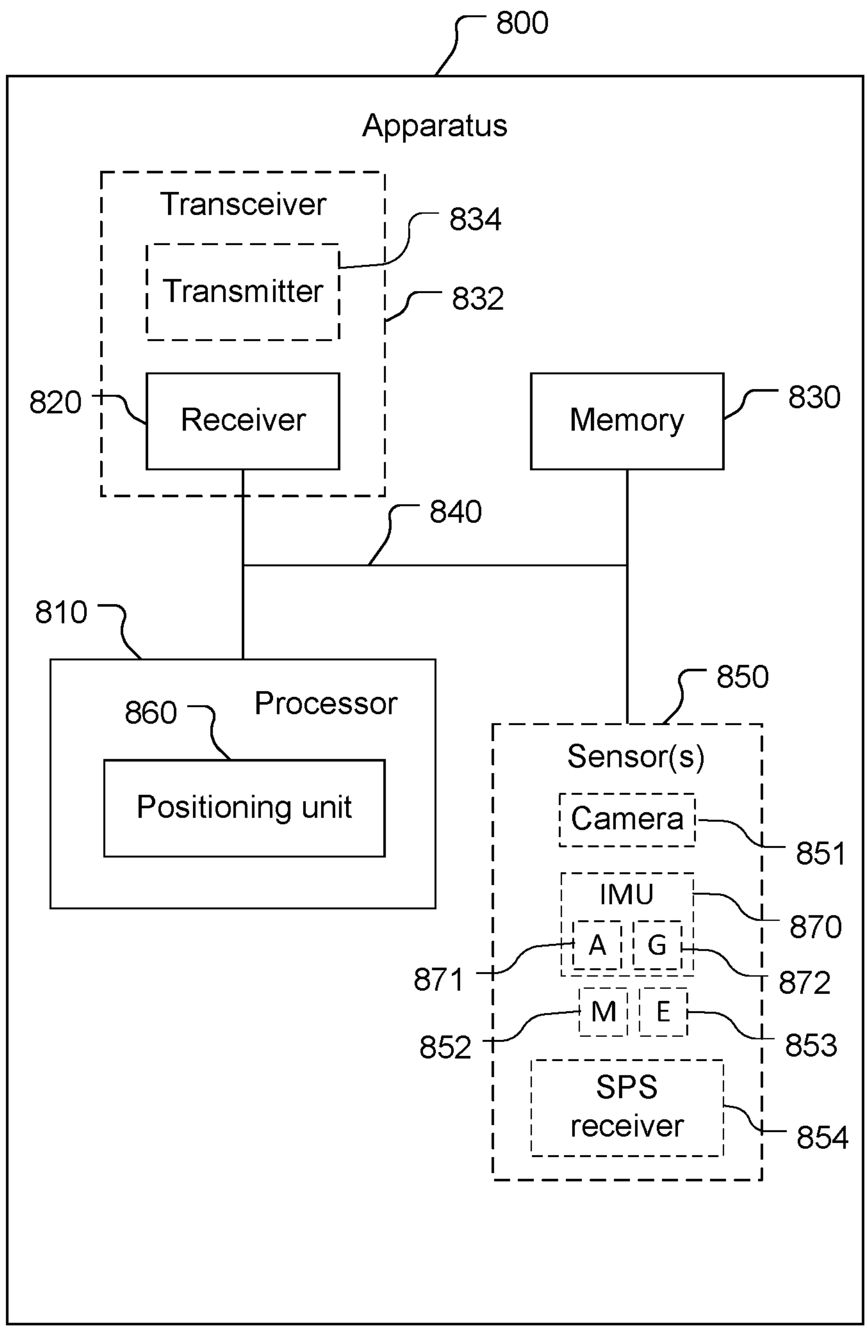
FIG. 8 is a block diagram of an example apparatus of an ego vehicle.

Referring also to FIG. 8, an apparatus 800, e.g., for use as a component of an ego vehicle, includes a processor 810, a receiver 820, and a memory 830 communicatively coupled to each other by a bus 840. Even if referred to in the singular, the processor 810 may include one or more processors, the receiver 820 may include one or more receivers, and the memory 830 may include one or more memories. The receiver 820 may be a portion of a transceiver 832 that includes a transmitter 834. Even if referred to in the singular, the transceiver 832 may include more than one transceiver 832 (e.g., one or more transmitters 834 and/or one or more receivers 820). The apparatus 800 may include the components shown in FIG. 8 in solid lines. The apparatus 800 may include one or more other components such as any of those shown in FIG. 8 in dashed lines, such as one or more sensors 850.

The memory 830 may be a non-transitory storage medium that may include random access memory (RAM), flash memory, disc memory, and/or read-only memory (ROM), etc. The memory 830 may store software which may be processor-readable, processor-executable software code containing instructions that may be configured to, when executed, cause the processor 810 to perform various functions described herein. Alternatively, the software may not be directly executable by the processor 810 but may be configured to cause the processor 810, e.g., when compiled and executed, to perform the functions. The processor 810 may include a memory with stored instructions in addition to and/or instead of the memory 830. Functionality of the processor 810 is discussed more fully below.

The description herein may refer to the processor 810 performing a function, but this includes other implementations such as where the processor 810 executes software (stored in the memory 830) and/or firmware. The description herein may refer to the apparatus 800 performing a function as shorthand for one or more appropriate components (e.g., the processor 810 and the memory 830) of the apparatus 800 performing the function. The processor 810 (possibly in conjunction with the memory 830 and, as appropriate, the receiver 820 (or the transceiver 832)) may include a positioning unit 860. The positioning unit 860 may be configured to perform positioning operations (e.g., determine position information (e.g., measurements, pseudoranges, position estimates, etc.). The positioning unit 860 is discussed further below, and the description may refer to the processor 810 generally, or the apparatus 800 generally, as performing any of the functions of the positioning unit 860, with the apparatus 800 being configured to perform the function(s).

The processor 810 may include one or more hardware devices, e.g., a central processing unit (CPU), a microcontroller, an application specific integrated circuit (ASIC), etc. The processor 810 may comprise multiple processors including a general-purpose/application processor, a Digital Signal Processor (DSP), a modem processor, a video processor, and/or a sensor processor. For example, the sensor processor may comprise, e.g., processors for RF (radio frequency) sensing (with one or more (cellular) wireless signals transmitted and reflection(s) used to identify, map, and/or track an object), and/or ultrasound, etc.

The sensor(s) 850 may include, for example, a camera 851, an Inertial Measurement Unit (IMU) 870, a magnetometer 852, an environment sensor 853, and/or an SPS receiver 854. Even if referred to in the singular, any of these devices may comprise multiple devices (e.g., the camera 851 may comprise multiple cameras). The IMU 870 may comprise, for example, an accelerometer 871 and/or a gyroscope 872. Even if referred to in the singular, any of these devices may comprise multiple devices (e.g., the accelerometer 871 may comprise multiple accelerometers, e.g., that may collectively respond to acceleration of the apparatus 800 in three dimensions) and/or the gyroscope 872 may comprise multiple gyroscopes 872 (e.g., three-dimensional gyroscope(s)). The sensor(s) 850 may include the magnetometers 852 (e.g., three-dimensional magnetometer(s)) to determine orientation (e.g., relative to magnetic north and/or true north) that may be used for any of a variety of purposes, e.g., to support one or more compass applications, etc. The environment sensor 853 may comprise, for example, one or more temperature sensors, one or more barometric pressure sensors, one or more ambient light sensors, one or more camera imagers, and/or one or more microphones, etc. The sensor(s) 850 may generate analog and/or digital signals indications of which may be stored in the memory 830 and processed by the processor 810 in support of one or more applications such as, for example, applications directed to positioning and/or navigation operations. The sensor(s) 850 may comprise one or more of other various types of sensors such as one or more optical sensors, one or more weight sensors, and/or one or more radio frequency (RF) sensors, etc.

The sensor(s) 850 may be used in relative location measurements, relative location determination, motion determination, etc. Information detected by the sensor(s) 850 may be used for motion detection, relative displacement, dead reckoning, sensor-based location determination, and/or sensor-assisted location determination. The sensor(s) 850 may be useful to determine whether the apparatus 800 is fixed (stationary) or mobile and/or whether to report certain useful information to a network entity (e.g., a server, a Location Management Function (LMF)) regarding the mobility of the apparatus 800. For example, based on the information obtained/measured by the sensor(s) 850, the apparatus 800 may notify/report to the LMF that the apparatus 800 has detected movements or that the apparatus 800 has moved, and may report the relative displacement/distance (e.g., via dead reckoning, or sensor-based location determination, or sensor-assisted location determination enabled by the sensor(s) 850). In another example, for relative positioning information, the sensors 850/IMU 870 may be used to determine the angle and/or orientation of the other device with respect to the apparatus 800, etc.

The IMU 870 may be configured to provide measurements about a direction of motion and/or a speed of motion of the apparatus 800, which may be used in relative location determination. For example, the accelerometer 871 and/or the gyroscope 872 of the IMU 870 may detect, respectively, a linear acceleration and a speed of rotation of the apparatus 800. The linear acceleration and speed of rotation measurements of the apparatus 800 may be integrated over time to determine an instantaneous direction of motion as well as a displacement of the apparatus 800. The instantaneous direction of motion and the displacement may be integrated to track a location of the apparatus 800. For example, a reference location of the apparatus 800 may be determined, e.g., using the SPS receiver 854 (and/or by some other means) for a moment in time and measurements from the accelerometer 871 and the gyroscope 872 taken after this moment in time may be used in dead reckoning to determine present location of the apparatus 800 based on movement (direction and distance) of the apparatus 800 relative to the reference location.

The magnetometer 852 may determine magnetic field strengths in different directions which may be used to determine orientation of the apparatus 800. For example, the orientation may be used to provide a digital compass for the apparatus 800. The magnetometer 852 may include a two-dimensional magnetometer configured to detect and provide indications of magnetic field strength in two orthogonal dimensions. The magnetometer 852 may include a three-dimensional magnetometer configured to detect and provide indications of magnetic field strength in three orthogonal dimensions. The magnetometer 852 may provide means for sensing a magnetic field and providing indications of the magnetic field, e.g., to the processor 810.

The transceiver 832 may include a wireless transceiver and a wired transceiver configured to communicate with other devices through wireless connections and wired connections, respectively. For example, the wireless transceiver may include a wireless transmitter and a wireless receiver coupled to an antenna for transmitting (e.g., on one or more uplink channels and/or one or more sidelink channels) and/or receiving (e.g., on one or more downlink channels and/or one or more sidelink channels) wireless signals and transducing signals from the wireless signals to guided (e.g., electrical, electromagnetic, and/or optical) signals and from guided (e.g., electrical, electromagnetic, and/or optical) signals to the wireless signals. The transceiver 832 may be configured to communicate signals (e.g., with a network entity such as a Transmission/Reception Point (TRP)) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. New Radio may use mm-wave frequencies and/or sub-6 GHZ frequencies.

The SPS receiver 854 (e.g., a Global Positioning System (GPS) receiver) may be capable of receiving and acquiring SPS signals via an SPS antenna. The SPS antenna is configured to transduce the SPS signals from wireless signals to guided signals, e.g., electrical, electromagnetic, and/or optical signals, and may be integrated with an antenna of the transceiver 832. The SPS receiver 854 may be configured to process, in whole or in part, the acquired SPS signals for estimating a location of the apparatus 800. For example, the SPS receiver 854 may be configured to determine location of the apparatus 800 by trilateration using the SPS signals. The processor 810 and the memory 830 may be utilized to process acquired SPS signals, in whole or in part, and/or to calculate an estimated location of the apparatus 800, in conjunction with the SPS receiver 854. The memory 830 may store indications (e.g., measurements) of the SPS signals and/or other signals (e.g., signals acquired from the transceiver 832) for use in performing positioning operations.

The apparatus 800 may include the camera 851 for capturing still or moving imagery. The camera 851 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the processor 810. Also or alternatively, a video processor portion of the processor 810 may perform conditioning, encoding, compression, and/or manipulation of signals representing captured images. The video processor may decode/decompress stored image data for presentation on a display device (not shown).

The positioning unit 860 may be configured to determine a position of the apparatus 800, motion of the apparatus 800, and/or relative position of the apparatus 800, and/or time. For example, the positioning unit 860 may communicate with, and/or include some of, the SPS receiver 854. The positioning unit 860 may also or alternatively be configured to determine location of the apparatus 800 using terrestrial-based signals for trilateration and/or triangulation, and/or for assistance with obtaining and using the SPS signals 260. The positioning unit 860 may be configured to determine location of the apparatus 800 based on a cell of a serving base station (e.g., a cell center) and/or another technique such as E-CID. The positioning unit 860 may be configured to use one or more images from the camera 851 and image recognition combined with known locations of landmarks (e.g., natural landmarks such as mountains and/or artificial landmarks such as buildings, bridges, streets, street signs, crosswalks, etc.) to determine location of the apparatus 800. The positioning unit 860 may be configured to use one or more other techniques (e.g., relying on a self-reported location of the apparatus 800 (e.g., part of a position beacon of the apparatus 800)) for determining the location of the apparatus 800, and may use a combination of techniques (e.g., SPS and terrestrial positioning signals) to determine the location of the apparatus 800. The positioning unit 860 may use information from one or more of the sensors 850 (e.g., the gyroscope 872, the accelerometer 871, the magnetometer 852, etc.) that may sense orientation and/or motion of the apparatus 800 and provide indications thereof that the processor 810 may be configured to use to determine motion (e.g., a velocity vector and/or an acceleration vector) of the apparatus 800. The positioning unit 860 may be configured to provide indications of uncertainty and/or error in the determined position and/or motion. Functionality of the positioning unit 860 may be provided in a variety of manners and/or configurations, and may be provided by hardware, software, firmware, or various combinations thereof.

Figure 9:
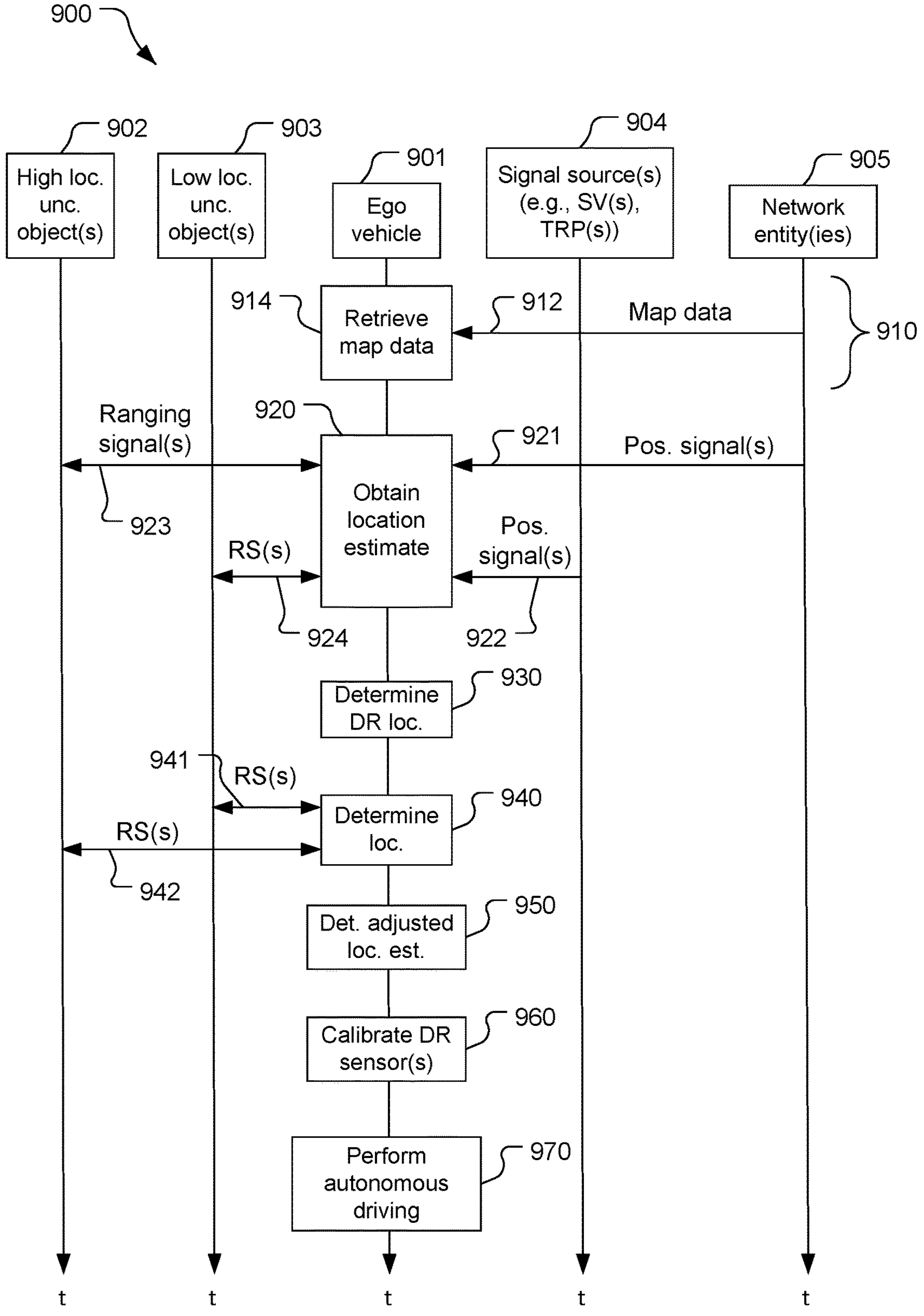
FIG. 9 is a signal and processing flow diagram for autonomous driving.

Referring also to FIG. 9, a signal and processing flow 900 for autonomous driving includes stages shown. The flow 900 is an example flow and not limiting. The flow 900 may be altered, e.g., by having one or more messages and/or one or more stages added, removed, rearranged, combined, performed concurrently, and/or having one or more messages split into multiple messages and/or one or more stages split into multiple stages. The flow 900 is an example an ego vehicle 901 containing the apparatus 800 using high-location-uncertainty objects 902, low-location-uncertainty objects 903 (high-location-accuracy objects), one or more signal sources 904, and one or more network entities 905 (e.g., a TRP, a server, and LMF, etc.) to determine a location estimate of the vehicle 901 and performing one or more autonomous driving operations based on the determined location estimate (although a location estimate may be referred to simply as a location).

Figures 10, 11:
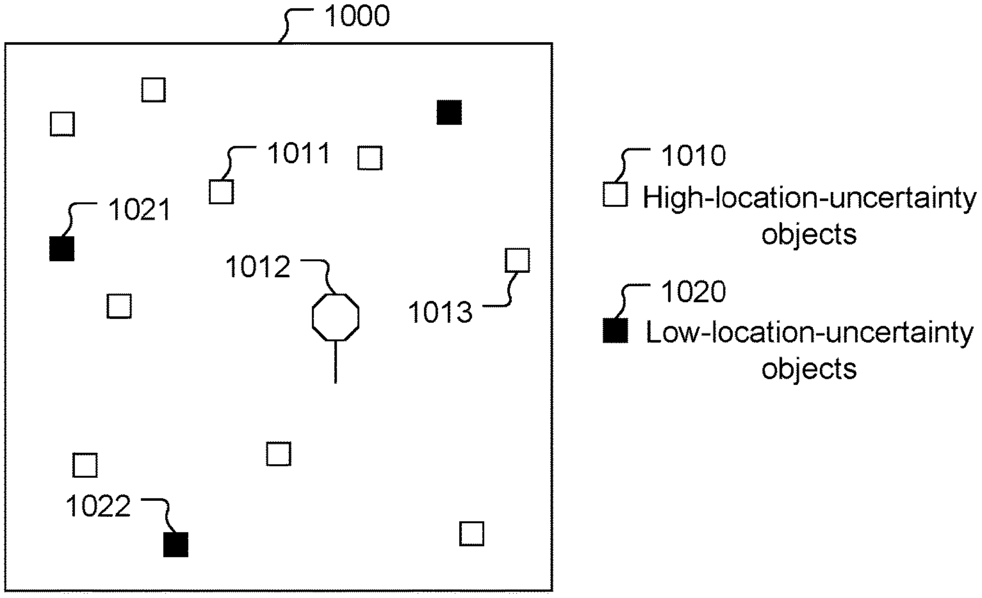
FIG. 10 is a simplified diagram of a map area including high-location-uncertainty objects and low-location-uncertainty objects.
FIG. 11 is a sample portion of a map data message shown in FIG. 9.

Referring also to FIG. 10, at stage 910, the ego vehicle 901 (e.g., the apparatus 800, with the apparatus 800 being part of a vehicle referred to as the ego vehicle 901) may obtain map data for a map region 1000. For example, the receiver 820 may receive a map data message 912 from the network entity 905. As another example, at sub-stage 914, the processor 810 may retrieve map data from the memory 830. As another example, the receiver 820 may receive map data from a mobile device (e.g., another vehicle in a V2V (Vehicle-to-Vehicle) communication, a V2X (Vehicle-to-Everything) communication, and/or a sidelink (SL) communication). The map data message 912 may include information about the map region 1000 including about high-location-uncertainty objects 1010 whose locations are known with high location uncertainty (e.g., higher than a threshold uncertainty such as 5 m, 10 m, or 20 m) and low-location-uncertainty objects 1020 whose locations are known with low location uncertainty (e.g., lower than a threshold uncertainty such as 10 cm, 50 cm, 1 m, 5 m). The uncertainty of a low-location-uncertainty object 1020 may be significantly, e.g., half or less than the uncertainty of a high-location-uncertainty object 1010, such as at least an order of magnitude lower than the uncertainty of a high-location-uncertainty object 1010. The low-location-uncertainty objects 1020 of the map region 1000 may be sparsely populated with the high-location-uncertainty objects 1010. For example, a density of the low-location-uncertainty objects 1020 (i.e., number of the low-location-uncertainty objects 1020 per unit area) may be lower than a density of the high-location-uncertainty objects 1010. For example, the density of the low-location-uncertainty objects 1020 may be at least an order of magnitude lower than the density of the high-location-uncertainty objects 1010. The disparity between densities of the low-location-uncertainty objects 1020 and the high-location-uncertainty objects 1010 may vary and may depend on a variety of factors such as cost for deploying the low-location-uncertainty objects 1020.

Referring also to FIG. 11, the map data message 912 may provide information that may be used by the ego vehicle 901 (e.g., by the apparatus 800) to determine a location estimate for the ego vehicle 901. For example, a map data message 1100, which is an example of a portion of the map data message 912, includes an object ID field 1110 (object identification field), an object characteristic field 1120, a location field 1130, a location uncertainty field 1140, a relative location field 1150, a relative location uncertainty field 1160, and a relative-to ID field 1170. More, fewer, and/or one or more different fields may be included in the map data message 912 than the fields shown of the map data message 1100 and/or one or more of the fields of the map data message 1100 may be omitted from the map data message 912. The map data message 1100 is an example of a portion of the map data message 912, e.g., because the map data message 1100 includes only five entries 1101, 1102, 1103, 1104, 1105 while there are more than five objects in the map region 1000. The object ID field 1110 provides a reference label or identifier of a corresponding object. In this example, the object ID field 1110 of the entries 1101-1105 indicate objects 1011, 1012, 1013, 1021, 1022 shown in FIG. 10. The object characteristic field 1120 may provide one or more identifying characteristics (e.g., size, shape, color, etc.) of an object to assist the apparatus 800 to identify an object (e.g., distinguishing the object from other objects) so the object may be used to help determine a location estimate for the ego vehicle 901. The object characteristic field 1120 may, for example, indicate an object classification (e.g., traffic sign, stop sign, traffic light, etc.) corresponding to an object of one or more known characteristics (e.g., stored in the memory 830). The location field 1130 provides a location for the corresponding object. The location uncertainty field 1140 provides an uncertainty of the corresponding location in the location field 1130. For example, the location uncertainty may be indicated in one or more of a variety of ways, e.g., a distance or a percentage, and multiple uncertainties may be indicated (e.g., a latitude uncertainty and a longitude uncertainty). As shown, the location uncertainties for the objects 1011, 1012, 1013 are all at least 8 m. This is an example, and other, e.g., higher, uncertainties may correspond to the objects 1011-1013. For example, if location data for the objects 1011-1013 are from a standard-definition map, the uncertainties may be about 25 m. The location uncertainties of the objects 1021, 1022 are below 0.5 m and thus may enable much more accurate location estimations for the ego vehicle 901 than the objects 1011-1013 alone (e.g., with error in ranges determined between the ego vehicle 901 and the objects 1021, 1022 dominated by sensor measurement error rather than location uncertainty). The relative location field 1150 may indicate a location of the object indicated in the object ID field 1110 relative to another object (e.g., as specified in the relative-to ID field 1170, or otherwise identified (e.g., by a location)). The relative location field 1150 may indicate the relative location in one or more of a variety of ways (e.g., a distance only, a distance and direction, a latitude separation and a longitude separation, and/or another manner). The relative location uncertainty field 1160 may indicate an uncertainty of the relative location indicated in the relative location field 1150. The relative location uncertainty of one object to another may be much lower than the location uncertainty of either object alone, and thus may be used to improve a location estimate for the ego vehicle 901 determined using object locations (e.g., as discussed above with respect to FIG. 6).

At stage 920, the ego vehicle 901 may obtain (e.g., receives and/or determines) a location estimate for the ego vehicle 901. For example, the receiver 820 may receive one or more positioning signals 921 from one or more of the network entity (ies) 905 (e.g., multiple base stations) and/or one or more positioning signals 922 from one or more of the signal source(s) 904 (e.g., one or more TRPs) and the processor 810 (e.g., the positioning unit 860) may perform an appropriate positioning method (e.g., Observed Time Difference of Arrival (OTDOA) and trilateration, triangulation, AOA and range) to determine the position estimate. As another example, the SPS receiver 854 may receive SPS signals as the positioning signals 922 and determine a location estimate for the ego vehicle 901. As another example, the receiver 820 may receive one or more ranging signals 923 (e.g., reflected radar signals transmitted by the ego vehicle 901) from one or more of the high-location-uncertainty objects 902 and use this (these) signal(s) to determine the location estimate. For example, the processor 810 may use multiple ranges to the objects 902, known locations of the objects 902, and trilateration to determine the location estimate. As another example, the processor 810 may use multiple directions to the objects 902 from the ego vehicle 901, known locations of the objects 902, and triangulation to determine the location estimate. As another example, the processor 810 may use the range and direction to one of the objects 902 and a known location of the object 902 to determine the location estimate. As another example, the processor 810 may use the ranges and directions to multiple ones of the objects 902 and known locations of the objects 902 to determine the location estimate. As another example, the receiver 820 may receive one or more ranging signals 924 (e.g., reflected radar signals transmitted by the ego vehicle 901) from one or more of the low-location-uncertainty objects 903 and use this (these) signal(s) to determine the location estimate. A combination of two or more of these techniques may be used to determine the location estimate (e.g., trilateration based on ranges to, and locations of, at least one of the objects 902 and at least one of the objects 903).

At stage 930, the ego vehicle 901 may determine one or more dead reckoning location estimates. For example, the processor 810 may use measurements from one or more of the sensors 850 to determine one or more location estimates using dead reckoning based on the location estimate obtained at stage 920. The determined location estimates may be determined for various times after determining the location estimate at stage 920.

At stage 940, the ego vehicle 901 may determine a location estimate for the ego vehicle 901 using one or more ranging signals reflected from at least one of the low-location-uncertainty objects 903. For example, the processor 810 (e.g., the positioning unit 860) may transmit one or more ranging signals 941 and receive one or more of the ranging signals 941 as reflected by one or more of the low-location-uncertainty objects 903. The processor 810 may identify one or more of the low-location-uncertainty objects 903, e.g., by analyzing one or more measurements from one or more of the sensors 850, e.g., an image taken by the camera 851, and retrieve the location(s) of the one or more low-location-uncertainty objects 903 from the memory 830. For example, the processor 810 may compare the measurement(s) with the object characteristic field 1120 of each of the entries 1101-1105 of the map data message 1100, identify any of the low-location-uncertainty objects 903 whose characteristic(s) match the indicated characteristic(s) and, for each matched object characteristic(s), use the location indicated in the location field 1130 corresponding to the matched object characteristic(s) in the object characteristic field 1120. The processor 810 may similarly identify one or more of the high-location-uncertainty objects 902, transmit one or more ranging signals 942, and receive one or more of the ranging signals 942 as reflected by one or more of the high-location-uncertainty objects 902. The processor 810, e.g., the positioning unit 860, may use the reflected signal(s) to determine a new location estimate of the ego vehicle 901. The processor 810 uses at least one ranging signal reflected by at least one of the low-location-uncertainty objects 903 such that the location estimate determined at stage 940 will be more accurate (e.g., of lower uncertainty) than a corresponding location estimate determined at stage 930 by dead reckoning. The corresponding location estimate determined at stage 930 by dead reckoning corresponds in time with the location estimate determined at stage 940. For example, a corresponding dead reckoning location estimate is determined from sensor measurement(s) most closely corresponding in time to the ranging signal measurements (e.g., time(s) of arrival of the measured ranging signal(s)) yielding the location estimate determined at stage 940.

At stage 950, an adjusted location estimate may be determined for the ego vehicle 901. For example, the processor 810 may combine (e.g., average) the location estimate determined at stage 940 and the corresponding dead reckoning location estimate determined at stage 930 to determine an adjusted location estimate for the ego vehicle 901.

At stage 960, one or more sensors used for dead reckoning may be calibrated. For example, the processor 810 may use a difference between the location estimate determined at stage 940 (or the adjusted location determined at stage 950) and a corresponding dead reckoning location estimate determined at stage 930 to adjust one or more of the sensors 850 used to determine the dead reckoning location estimate determined at stage 930.

At stage 970, the ego vehicle 901 may perform autonomous driving. For example, the processor 810 may use the location estimate determined at stage 940 to determine and execute one or more autonomous driving operations (e.g., turning the ego vehicle 901, changing a speed of the ego vehicle 901, etc.). Alternatively, the processor 810 may transmit the location estimate determined at stage 940 to another component of the ego vehicle 901, e.g., an ADAS (Advanced Driver Assistance System), such that the other component may determine and execute one or more autonomous driving operations. Alternatively, the processor 810 may use or transmit the adjusted location determined at stage 950 to implement autonomous driving.

Figure 12:
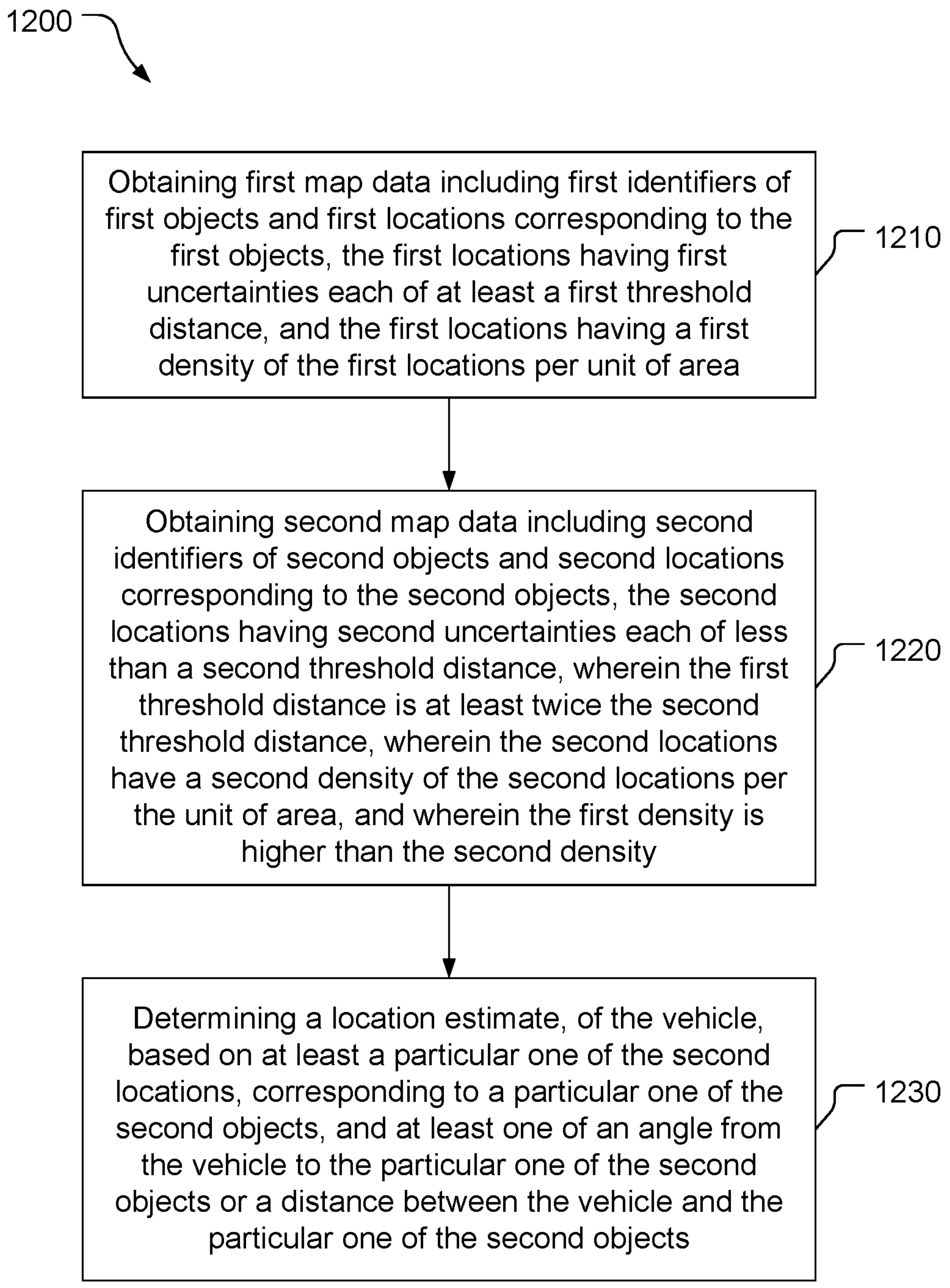
FIG. 12 is a block flow diagram of a method of determining location of a vehicle.

Referring to FIG. 12, with further reference to FIGS. 1-11, a method 1200 of determining location of a vehicle includes the stages shown. The method 1200 is, however, an example only and not limiting. The method 1200 may be altered, e.g., by having one or more stages added, removed, rearranged, combined, performed concurrently, and/or by having one or more single stages split into multiple stages.

At stage 1210, the method 1200 includes obtaining first map data including first identifiers of first objects and first locations corresponding to the first objects, the first locations having first uncertainties each of at least a first threshold distance, and the first locations having a first density of the first locations per unit of area. For example, the ego vehicle 901 (e.g., the apparatus 800) may receive the map data message 912 from the network entity and/or may retrieve map data from the memory 830 at sub-stage 914. The map data may include, e.g., as with the map data message 1100, data identifying the high-location-uncertainty objects 902 (e.g., in the example of the message 1100, the high-location-uncertainty objects 1011-1013). The processor 810, possibly in combination with the memory 830, possibly in combination with the receiver 820, may comprise means for obtaining the first map data.

At stage 1220, the method 1200 includes obtaining second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density. For example, the ego vehicle 901 (e.g., the apparatus 800) may receive the map data message 912 from the network entity 905 and/or may retrieve map data from the memory 830 at sub-stage 914. The map data may include, e.g., as with the map data message 1100, data identifying the low-location-uncertainty objects 903 (e.g., in the example of the message 1100, the low-location-uncertainty objects 1021, 1022). The processor 810, possibly in combination with the memory 830, possibly in combination with the receiver 820, may comprise means for obtaining the second map data.

At stage 1230, the method 1200 includes determining a location estimate, of the vehicle, based on at least a particular one of the second locations, corresponding to a particular one of the second objects, and at least one of an angle from the vehicle to the particular one of the second objects or a distance between the vehicle and the particular one of the second objects. For example, the processor 810, e.g., the positioning unit 860, may determine a location estimate of the ego vehicle 901 at stage 920 or stage 940. The processor 810, possibly in combination with the memory 830, may comprise means for determining the location estimate.

Implementations of the method 1200 may include one or more of the following features. In an example implementation, the location estimate is a third location estimate, and wherein the method further includes: obtaining a first location estimate, of the vehicle, corresponding to a first time; determining a second location estimate, of the vehicle and relative to the first location estimate, corresponding to a second time using dead reckoning; and determining an adjusted location estimate corresponding to the second time based at least in part on the second location estimate and the third location estimate. For example, the processor 810 may obtain a location estimate of the ego vehicle 901 at stage 920, determine a dead reckoning location estimate at stage 930 based on the location estimate determined at stage 920, and determine an adjusted location estimate at stage 950 based on the dead reckoning location estimate determined at stage 930 and the location estimate determined at stage 940 (based at least in part on a ranging signal reflected by a low-location-uncertainty object 903). The processor 810, possibly in combination with the memory 830, possibly in combination with the receiver 820, may comprise means for obtaining the first location estimate. The processor 810, possibly in combination with the memory 830, in combination with one or more of the sensors 850 may comprise means for determining the second location estimate. The processor 810, possibly in combination with the memory 830, may comprise means for determining the adjusted location estimate. In a further example implementation, the method 1200 includes calibrating at least one motion sensor of the vehicle, at least one measurement from which was used to determine the second location estimate using dead reckoning, based on the second location estimate and at least one of the third location estimate or the adjusted location estimate. For example, the processor 810 may calibrate (e.g., adjust one or more settings of and/or one or more compensation factors of) one or more of the sensors 850 at stage 960. The processor 810, possibly in combination with the memory 830, in combination with one or more of the sensors 850 may comprise means for calibrating at least one motion sensor. In another further example implementation, determining the third location estimate further includes: determining a separation between a first pair member, of a pair of the first objects, and a second pair member, of the pair of the first objects; determining a first adjusted location of the first pair member based on the separation between the first pair member and the second pair member; and determining the third location estimate based on the first adjusted location of the first pair member. For example, at stage 940, a separation between a pair of objects (e.g., at least one of the objects 902 and/or at least one of the objects 903) may be determined (e.g., by analyzing one or more images from the camera 851, or by analyzing map data such as the entry 1102 of the map data message 1100). This separation may be used to determine a more accurate location information for one or both of the objects in the pair. The processor 810, e.g., the positioning unit 860, may use the adjusted location information to determine a location estimate of the ego vehicle 901 (e.g., using trilateration and/or triangulation). The processor 810, possibly in combination with the memory 830, possibly in combination with one or more of the sensors 850 (e.g., the camera 851), may comprise means for determining the separation between the first pair member and the second pair member. The processor 810, possibly in combination with the memory 830, may comprise means for determining the first adjusted location and means for determining the third location estimate. In another further example implementation, obtaining the first location estimate comprises receiving the first location estimate from a satellite position system receiver of the vehicle. For example, the SPS receiver 854 may provide a location estimate for the ego vehicle 901 to the processor 810. The processor 810, possibly in combination with the memory 830, may comprise means for obtaining the first location estimate.

Implementation Examples

Implementation examples are described in the following numbered clauses:

Clause 1. A method of determining location of a vehicle, the method comprising:

obtaining first map data including first identifiers of first objects and first locations corresponding to the first objects, the first locations having first uncertainties each of at least a first threshold distance, and the first locations having a first density of the first locations per unit of area;

obtaining second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determining a location estimate, of the vehicle, based on at least a particular one of the second locations, corresponding to a particular one of the second objects, and at least one of an angle from the vehicle to the particular one of the second objects or a distance between the vehicle and the particular one of the second objects.

Clause 2. The method of clause 1, wherein the location estimate is a third location estimate, and wherein the method further comprises:

obtaining a first location estimate, of the vehicle, corresponding to a first time;

determining a second location estimate, of the vehicle and relative to the first location estimate, corresponding to a second time using dead reckoning; and determining an adjusted location estimate corresponding to the second time based at least in part on the second location estimate and the third location estimate.

Clause 3. The method of clause 2, further comprising calibrating at least one motion sensor of the vehicle, at least one measurement from which was used to determine the second location estimate using dead reckoning, based on the second location estimate and at least one of the third location estimate or the adjusted location estimate.

Clause 4. The method of clause 2, wherein determining the third location estimate further comprises:

determining a separation between a first pair member, of a pair of the first objects, and a second pair member, of the pair of the first objects;

determining a first adjusted location of the first pair member based on the separation between the first pair member and the second pair member; and determining the third location estimate based on the first adjusted location of the first pair member.

Clause 5. The method of clause 2, wherein obtaining the first location estimate comprises receiving the first location estimate from a satellite position system receiver of the vehicle.

Clause 6. An apparatus, of an ego vehicle, comprising:

at least one memory;

at least one receiver; and at least one processor, communicatively coupled to the at least one memory and the at least one receiver, configured to:

obtain first map data including first identifiers of first objects and first locations corresponding to the first objects, the first locations having first uncertainties each of at least a first threshold distance, and the first locations having a first density of the first locations per unit of area;

obtain second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determine a location estimate, of the ego vehicle, based on at least a particular one of the second locations, corresponding to a particular one of the second objects, and at least one of an angle from the apparatus to the particular one of the second objects or a distance between the apparatus and the particular one of the second objects.

Clause 7. The apparatus of clause 6, wherein the location estimate is a third location estimate, wherein the apparatus further comprises at least one motion sensor communicatively coupled to the at least one processor, and wherein the at least one processor is further configured to:

obtain a first location estimate, of the ego vehicle, corresponding to a first time;

determine a second location estimate, of the ego vehicle and relative to the first location estimate, corresponding to a second time using dead reckoning based on measurements from the at least one motion sensor; and determining an adjusted location estimate corresponding to the second time based at least in part on the second location estimate and the third location estimate.

Clause 8. The apparatus of clause 7, wherein the at least one processor is further configured to calibrate at least one of the at least one motion sensor based on the second location estimate and at least one of the third location estimate or the adjusted location estimate.

Clause 9. The apparatus of clause 7, wherein to determine the third location estimate the at least one processor is configured to:

determine a separation between a first pair member, of a pair of the first objects, and a second pair member, of the pair of the first objects;

determine a first adjusted location of the first pair member based on the separation between the first pair member and the second pair member; and determine the third location estimate based on the first adjusted location of the first pair member.

Clause 10. The apparatus of clause 7, wherein to obtain the first location estimate the at least one processor is configured to receive the first location estimate from a satellite position system receiver of the ego vehicle.

Clause 11. An apparatus, of an ego vehicle, comprising:

means for obtaining first map data including first identifiers of first objects and first locations corresponding to the first objects, the first locations having first uncertainties each of at least a first threshold distance, and the first locations having a first density of the first locations per unit of area;

means for obtaining second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and means for determining a location estimate, of the ego vehicle, based on at least a particular one of the second locations, corresponding to a particular one of the second objects, and at least one of an angle from the ego vehicle to the particular one of the second objects or a distance between the ego vehicle and the particular one of the second objects.

Clause 12. The apparatus of clause 11, wherein the location estimate is a third location estimate, and wherein the apparatus further comprises:

means for obtaining a first location estimate, of the ego vehicle, corresponding to a first time;

means for determining a second location estimate, of the ego vehicle and relative to the first location estimate, corresponding to a second time using dead reckoning; and means for determining an adjusted location estimate corresponding to the second time based at least in part on the second location estimate and the third location estimate.

Clause 13. The apparatus of clause 12, further comprising means for calibrating at least one motion sensor of the ego vehicle, at least one measurement from which is used to determine the second location estimate using dead reckoning, based on the second location estimate and at least one of the third location estimate or the adjusted location estimate.

Clause 14. The apparatus of clause 12, wherein the means for determining the third location estimate include:

means for determining a separation between a first pair member, of a pair of the first objects, and a second pair member, of the pair of the first objects;

means for determining a first adjusted location of the first pair member based on the separation between the first pair member and the second pair member; and means for determining the third location estimate based on the first adjusted location of the first pair member.

Clause 15. The apparatus of clause 12, wherein the means for obtaining the first location estimate comprise means for receiving the first location estimate from a satellite position system receiver of the ego vehicle.

Clause 16. A non-transitory, processor-readable storage medium comprising processor-readable instructions to cause at least one processor of an apparatus, of an ego vehicle, to:

obtain first map data including first identifiers of first objects and first locations corresponding to the first objects, the first locations having first uncertainties each of at least a first threshold distance, and the first locations having a first density of the first locations per unit of area;

obtain second map data including second identifiers of second objects and second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density; and determine a location estimate, of the ego vehicle, based on at least a particular one of the second locations, corresponding to a particular one of the second objects, and at least one of an angle from the ego vehicle to the particular one of the second objects or a distance between the ego vehicle and the particular one of the second objects.

Clause 17. The non-transitory, processor-readable storage medium of clause 16, wherein the location estimate is a third location estimate, and wherein the non-transitory, processor-readable storage medium further comprises processor-readable instructions to cause the at least one processor:

obtain a first location estimate, of the ego vehicle, corresponding to a first time;

determine a second location estimate, of the ego vehicle and relative to the first location estimate, corresponding to a second time using dead reckoning; and determine an adjusted location estimate corresponding to the second time based at least in part on the second location estimate and the third location estimate.

Clause 18. The non-transitory, processor-readable storage medium of clause 17, further comprising processor-readable instructions to cause the at least one processor to calibrate at least one motion sensor of the ego vehicle, at least one measurement from which is used to determine the second location estimate using dead reckoning, based on the second location estimate and at least one of the third location estimate or the adjusted location estimate.

Clause 19. The non-transitory, processor-readable storage medium of clause 17, wherein the processor-readable instructions to cause the at least one processor to determine the third location estimate include processor-readable instructions to cause the at least one processor to:

determine a separation between a first pair member, of a pair of the first objects, and a second pair member, of the pair of the first objects;

determine a first adjusted location of the first pair member based on the separation between the first pair member and the second pair member; and determine the third location estimate based on the first adjusted location of the first pair member.

Clause 20. The non-transitory, processor-readable storage medium of clause 17, wherein the processor-readable instructions to cause the at least one processor to obtain the first location estimate comprise processor-readable instructions to cause the at least one processor to receive the first location estimate from a satellite position system receiver of the ego vehicle.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

What is claimed is:

1. A method of autonomous driving of a vehicle, the method comprising:

obtaining first map data including first identifiers of first objects and including first locations corresponding to the first objects, the first locations having first uncertainties each of at least a first threshold distance, and the first locations having a first density of the first locations per unit of area;

obtaining second map data including second identifiers of second objects and including second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density;

determining a dead reckoning location estimate of the vehicle using dead reckoning;

transmitting at least one ranging signal from the vehicle;

measuring, based on having determined the dead reckoning location estimate using dead reckoning, a reflection of the at least one ranging signal from a particular one of the second objects to determine at least one of an angle from the vehicle to the particular one of the second objects or a distance between the vehicle and the particular one of the second objects, wherein the reflection of the at least one ranging signal from the particular one of the second objects is measured with respect to a second location that corresponds to the particular one of the second objects, wherein the second location has a second uncertainty that is less than the first uncertainties, and wherein the second location is associated with the second density of the second locations;

determining a location estimate of the vehicle based on the dead reckoning location estimate, the second location, and at least one of the angle from the vehicle to the particular one of the second objects or the distance between the vehicle and the particular one of the second objects; and performing an autonomous driving operation based on the location estimate.

2. The method of claim 1, wherein the location estimate is a third location estimate, wherein the dead reckoning location estimate is a second location estimate, and wherein the method further comprises:

obtaining a first location estimate of the vehicle corresponding to a first time, wherein the second location estimate is relative to the first location estimate and corresponds to a second time; and determining an adjusted location estimate corresponding to the second time based at least in part on the second location estimate and the third location estimate.

3. The method of claim 2, further comprising:

calibrating at least one motion sensor of the vehicle, at least one measurement from which was used to determine the second location estimate using dead reckoning, based on the second location estimate and at least one of the third location estimate or the adjusted location estimate.

4. The method of claim 2, wherein determining the third location estimate comprises:

determining a separation between a first pair member of a pair of the first objects and a second pair member of the pair of the first objects;

determining a first adjusted location of the first pair member based on the separation between the first pair member and the second pair member; and determining the third location estimate based on the first adjusted location of the first pair member.

5. The method of claim 2, wherein obtaining the first location estimate comprises:

receiving the first location estimate from a satellite position system receiver of the vehicle.

6. An apparatus, of an ego vehicle, comprising:

at least one memory;

at least one motion sensor;

at least one receiver; and at least one processor, communicatively coupled to the at least one memory, the at least one motion sensor, and the at least one receiver, configured to:

obtain first map data including first identifiers of first objects and including first locations corresponding to the first objects, the first locations having first uncertainties each of at least a first threshold distance, and the first locations having a first density of the first locations per unit of area;

obtain second map data including second identifiers of second objects and including second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density;

determine a dead reckoning location estimate of the ego vehicle using dead reckoning and based on measurements from the at least one motion sensor;

transmit at least one ranging signal from the ego vehicle;

measure, based on having determined the dead reckoning location estimate using dead reckoning, a reflection of the at least one ranging signal from a particular one of the second objects to determine at least one of an angle from the ego vehicle to the particular one of the second objects or a distance between the ego vehicle and the particular one of the second objects, wherein the reflection of the at least one ranging signal from the particular one of the second objects is measured with respect to a second location that corresponds to the particular one of the second objects, wherein the second location has a second uncertainty that is less than the first uncertainties, and wherein the second location is associated with the second density of the second locations;

determine a location estimate of the ego vehicle based on the dead reckoning location estimate, the second location, and at least one of the angle from the ego vehicle to the particular one of the second objects or the distance between the ego vehicle and the particular one of the second objects; and perform an autonomous driving operation based on the location estimate.

7. The apparatus of claim 6, wherein the location estimate is a third location estimate, wherein the dead reckoning location estimate is a second location estimate, and wherein the at least one processor is further configured to:

obtain a first location estimate of the ego vehicle corresponding to a first time, wherein the second location estimate is relative to the first location estimate and corresponds to a second time; and determine an adjusted location estimate corresponding to the second time based at least in part on the second location estimate and the third location estimate.

8. The apparatus of claim 7, wherein the at least one processor is further configured to:

calibrate at least one of the at least one motion sensor based on the second location estimate and at least one of the third location estimate or the adjusted location estimate.

9. The apparatus of claim 7, wherein, to determine the third location estimate, the at least one processor is configured to:

determine a separation between a first pair member of a pair of the first objects and a second pair member of the pair of the first objects;

determine a first adjusted location of the first pair member based on the separation between the first pair member and the second pair member; and determine the third location estimate further based on the first adjusted location of the first pair member.

10. The apparatus of claim 7, wherein, to obtain the first location estimate, the at least one processor is configured to:

receive the first location estimate from a satellite position system receiver of the ego vehicle.

11. An apparatus, of an ego vehicle, comprising:

means for obtaining first map data including first identifiers of first objects and including first locations corresponding to the first objects, the first locations having first uncertainties each of at least a first threshold distance, and the first locations having a first density of the first locations per unit of area;

means for obtaining second map data including second identifiers of second objects and including second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density;

means for determining a dead reckoning location estimate of the ego vehicle using dead reckoning;

means for transmitting at least one ranging signal from the ego vehicle;

means for measuring, based on having determined the dead reckoning location estimate using dead reckoning, a reflection of the at least one ranging signal from a particular one of the second objects to determine at least one of an angle from the ego vehicle to the particular one of the second objects or a distance between the ego vehicle and the particular one of the second objects, wherein the reflection of the at least one ranging signal from the particular one of the second objects is measured with respect to a second location that corresponds to the particular one of the second objects, wherein the second location has a second uncertainty that is less than the first uncertainties, and wherein the second location is associated with the second density of the second locations;

means for determining a location estimate of the ego vehicle based on the dead reckoning location estimate, the second location, and at least one of the angle from the ego vehicle to the particular one of the second objects or the distance between the ego vehicle and the particular one of the second objects; and means for performing an autonomous driving operation based on the location estimate.

12. The apparatus of claim 11, wherein the location estimate is a third location estimate, wherein the dead reckoning location estimate is a second location estimate, and wherein the apparatus further comprises:

means for obtaining a first location estimate of the ego vehicle corresponding to a first time, wherein the second location estimate is relative to the first location estimate and corresponds to a second time; and means for determining an adjusted location estimate corresponding to the second time based at least in part on the second location estimate and the third location estimate.

13. The apparatus of claim 12, further comprising:

means for calibrating at least one motion sensor of the ego vehicle, at least one measurement from which is used to determine the second location estimate using dead reckoning, based on the second location estimate and at least one of the third location estimate or the adjusted location estimate.

14. The apparatus of claim 12, wherein the means for determining the third location estimate include:

means for determining a separation between a first pair member of a pair of the first objects and a second pair member of the pair of the first objects;

means for determining a first adjusted location of the first pair member based on the separation between the first pair member and the second pair member; and means for determining the third location estimate further based on the first adjusted location of the first pair member.

15. The apparatus of claim 12, wherein the means for obtaining the first location estimate comprise:

means for receiving the first location estimate from a satellite position system receiver of the ego vehicle.

16. A non-transitory, processor-readable storage medium comprising processor-readable instructions to cause at least one processor of an apparatus, of an ego vehicle, for autonomous driving of the ego vehicle, to:

obtain first map data including first identifiers of first objects and including first locations corresponding to the first objects, the first locations having first uncertainties each of at least a first threshold distance, and the first locations having a first density of the first locations per unit of area;

obtain second map data including second identifiers of second objects and including second locations corresponding to the second objects, the second locations having second uncertainties each of less than a second threshold distance, wherein the first threshold distance is at least twice the second threshold distance, wherein the second locations have a second density of the second locations per the unit of area, and wherein the first density is higher than the second density;

determine a dead reckoning location estimate of the ego vehicle using dead reckoning;

transmit at least one ranging signal from the ego vehicle;

measure, based on having determined the dead reckoning location estimate using dead reckoning, a reflection of the at least one ranging signal from a particular one of the second objects to determine at least one of an angle from the ego vehicle to the particular one of the second objects or a distance between the ego vehicle and the particular one of the second objects, wherein the reflection of the at least one ranging signal from the particular one of the second objects is measured with respect to a second location that corresponds to the particular one of the second objects, wherein the second location has a second uncertainty that is less than the first uncertainties, and wherein the second location is associated with the second density of the second locations;

determine a location estimate of the ego vehicle based on the dead reckoning location estimate, the second location, and at least one of the angle from the ego vehicle to the particular one of the second objects or the distance between the ego vehicle and the particular one of the second objects; and perform an autonomous driving operation based on the location estimate.

17. The non-transitory, processor-readable storage medium of claim 16, wherein the location estimate is a third location estimate, wherein the dead reckoning location estimate is a second location estimate, and wherein the non-transitory, processor-readable storage medium further comprises processor-readable instructions to cause the at least one processor to:

obtain a first location estimate of the ego vehicle corresponding to a first time, wherein the second location estimate is relative to the first location estimate and corresponds to a second time; and determine an adjusted location estimate corresponding to the second time based at least in part on the second location estimate and the third location estimate.

18. The non-transitory, processor-readable storage medium of claim 17, further comprising processor-readable instructions to cause the at least one processor to:

calibrate at least one motion sensor of the ego vehicle, at least one measurement from which is used to determine the second location estimate using dead reckoning, based on the second location estimate and at least one of the third location estimate or the adjusted location estimate.

19. The non-transitory, processor-readable storage medium of claim 17, wherein the processor-readable instructions to cause the at least one processor to determine the third location estimate include processor-readable instructions to cause the at least one processor to:

determine a separation between a first pair member of a pair of the first objects and a second pair member of the pair of the first objects;

determine a first adjusted location of the first pair member based on the separation between the first pair member and the second pair member; and determine the third location estimate further based on the first adjusted location of the first pair member.

20. The non-transitory, processor-readable storage medium of claim 17, wherein the processor-readable instructions to cause the at least one processor to obtain the first location estimate comprise processor-readable instructions to cause the at least one processor to:

receive the first location estimate from a satellite position system receiver of the ego vehicle.

* * * * *